United States Patent
Pertsel et al.

(10) Patent No.: US 10,999,559 B1
(45) Date of Patent: May 4, 2021

(54) ELECTRONIC SIDE-MIRROR WITH MULTIPLE FIELDS OF VIEW

(71) Applicant: Ambarella International LP, Santa Clara, CA (US)

(72) Inventors: Shimon Pertsel, Mountain View, CA (US); Alexander Fink, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 508 days.

(21) Appl. No.: 14/851,500

(22) Filed: Sep. 11, 2015

(51) Int. Cl.
*B60R 1/00* (2006.01)
*H04N 7/18* (2006.01)
*G06T 15/20* (2011.01)
*G06K 9/00* (2006.01)

(52) U.S. Cl.
CPC .............. *H04N 7/183* (2013.01); *B60R 1/00* (2013.01); *G06K 9/00791* (2013.01); *G06T 15/205* (2013.01); *B60R 2300/306* (2013.01); *B60R 2300/60* (2013.01); *B60R 2300/802* (2013.01)

(58) Field of Classification Search
CPC . B60R 1/00; B60R 2300/60; B60R 2300/802; B60R 2300/306
See application file for complete search history.

(56) References Cited

U.S. PATENT DOCUMENTS

| | | | | |
|---|---|---|---|---|
| 2005/0174429 A1* | 8/2005 | Yanai | .................. | B60R 1/00 348/148 |
| 2010/0182432 A1* | 7/2010 | Augst | .................. | B60R 1/00 348/148 |
| 2010/0201816 A1* | 8/2010 | Lee | .................. | B60R 1/12 348/148 |
| 2011/0187828 A1* | 8/2011 | Kim | .................. | H04N 13/20 348/46 |
| 2012/0169875 A1* | 7/2012 | Matsukawa | .................. | B60R 1/00 348/148 |
| 2014/0055616 A1* | 2/2014 | Corcoran | .................. | B60R 1/00 348/148 |
| 2014/0118551 A1* | 5/2014 | Ikeda | .................. | B60R 1/00 348/148 |
| 2015/0232028 A1* | 8/2015 | Reardon | .................. | B60R 1/00 348/148 |
| 2015/0232030 A1* | 8/2015 | Bongwald | .................. | B60R 1/00 348/115 |

OTHER PUBLICATIONS

Pertsel, Shimon et al., "Blind-Spot Monitoring Using Machine Vision and Precise FOV Information", U.S. Appl. No. 14/706,222, filed May 7, 2015, 59 pages.

* cited by examiner

*Primary Examiner* — Brian T Pendleton
*Assistant Examiner* — Kyle M Lotfi
(74) *Attorney, Agent, or Firm* — Christopher P. Maiorana, PC

(57) ABSTRACT

An apparatus comprising a sensor and a processor. The sensor may be configured to generate a first video signal based on a targeted view from a vehicle. The processor may be configured to (A) receive the first video signal, (B) generate a second video signal and (C) present the second video signal to a display. The second video signal presents a series of video frames configured to fit a shape of the display. The processor selects among a plurality of fields of view for the video frames based on a decision by the processor.

11 Claims, 16 Drawing Sheets

ELECTRONIC SIDE-MIRROR WITH MULTIPLE FIELDS OF VIEW

FIELD OF THE INVENTION

The present invention relates to video capture devices generally and, more particularly, to an electronic side mirror with multiple fields of view.

BACKGROUND OF THE INVENTION

Electronic mirrors (eMirrors) are replacing physical reflective side mirrors in vehicles. In a conventional electronic mirror, a camera is located in one location of a vehicle and an LCD screen is located in another location of a vehicle. Processing/cabling connects the camera and screen. Electronic mirrors have problems similar to physical reflective side mirrors. A mirror with a narrow field of view (FOV) will leave the driver with a blind spot in the space between the FOV of the mirror and the peripheral vision of the driver. A mirror with a wide FOV will make objects appear farther away than they really are, which can cause the driver to misjudge distance.

Conventional physical reflective mirrors attempt to solve some of these problems. Some reflective mirrors split the mirror surface to offer drivers a narrow FOV on one side and a wider FOV on another. Some reflective mirrors include overlaid mirrors to offer a driver a narrow FOV on most of the space and a wide FOV in one of the corners. Some vehicles have mechanical switches that allow drivers to switch from one FOV to another FOV.

It would be desirable to implement an electronic mirror that provides multiple FOVs.

SUMMARY OF THE INVENTION

The present invention concerns an apparatus comprising a sensor and a processor. The sensor may be configured to generate a first video signal based on a targeted view from a vehicle. The processor may be configured to (A) receive the first video signal, (B) generate a second video signal and (C) present the second video signal to a display. The second video signal presents a series of video frames configured to fit a shape of the display. The processor selects among a plurality of fields of view for the video frames based on a decision by the processor.

The objects, features and advantages of the present invention include providing an electronic mirror that may (i) provide multiple FOVs, (ii) allow a user to switch between the multiple FOVs, (iii) automatically switch between the multiple FOVs based on sensor information from a vehicle, (iv) automatically switch between the multiple FOVs based on objects detected in a video signal, (v) increase driver safety and/or (vi) be cost effective to implement.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Figure 1:
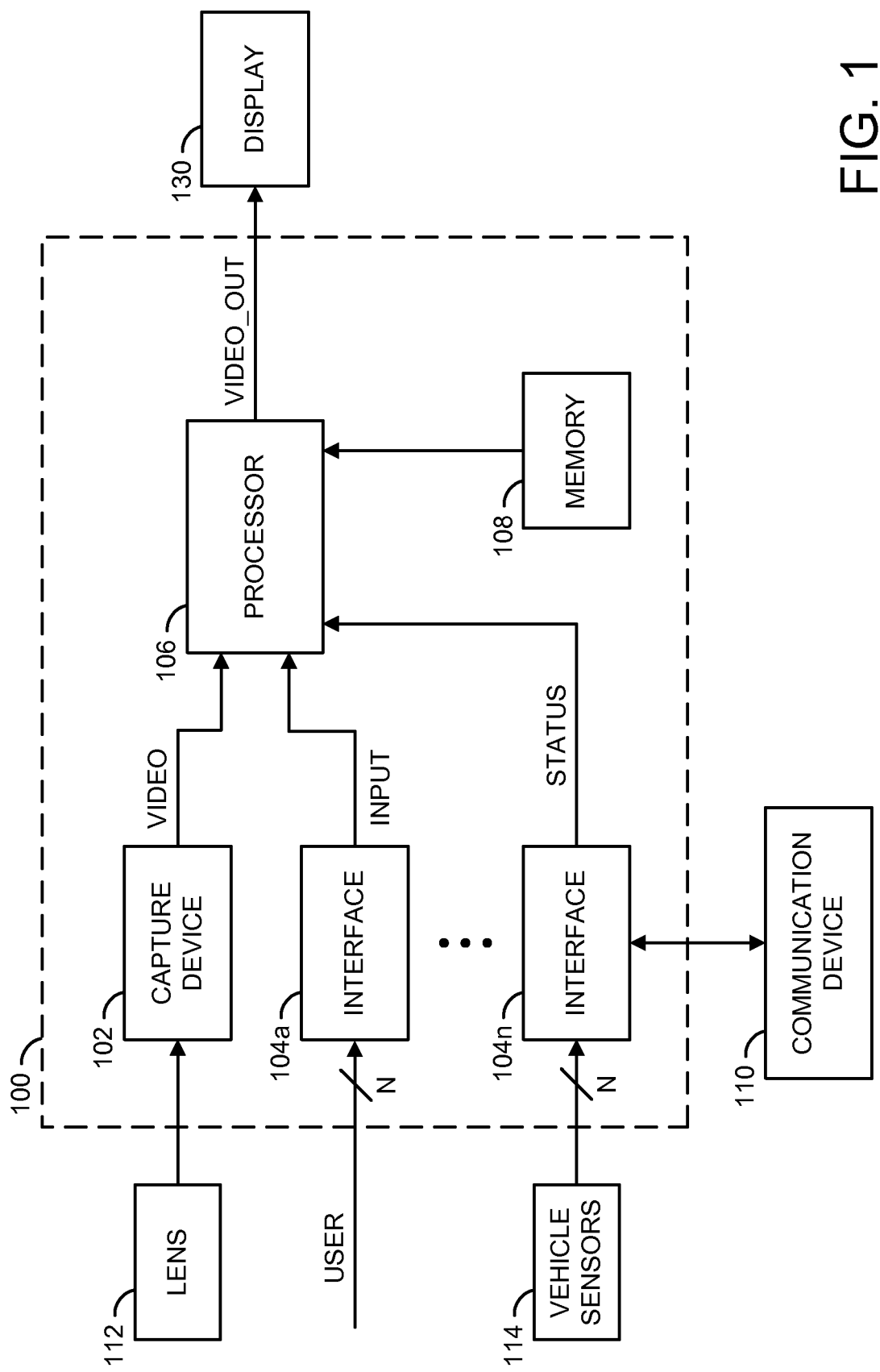
FIG. 1 is a block diagram of an example embodiment of an apparatus.

Referring to FIG. 1, a block diagram of an apparatus 100 is shown in accordance with an embodiment of the present invention. The apparatus 100 may be a camera system. The camera system 100 may comprise a block (or circuit) 102, blocks (or circuits) 104a-104n, a block (or circuit) 106, and a block (or circuit) 108. The circuit 102 may implement a capture device. The circuits 104a-104n may implement various interfaces. The circuit 106 may be configured as a processor. The circuit 108 may be configured as a memory. The memory 108 may be configured to store computer readable/executable instructions (or firmware). The instructions, when executed by the processor 106, may perform a number of steps.

The camera system 100 is shown connected to a block (or circuit) 110, a block (or circuit) 112, a block (or circuit) 114 and a block (or circuit) 130. The circuit 110 may be an external communication device. In some embodiments, the communication device 110 may be implemented as part of the camera system 100.

The block 112 may be a lens (e.g., a camera lens). In some embodiments, the lens 112 may be implemented as part of the camera system 100. The circuit 114 may represent various vehicle sensors. The circuit 114 may be implemented as one or more sensors (e.g., a location module such as a GPS sensor, an orientation module such as a magnetometer, a temperature sensor, steering wheel sensors, turn indicator signals, any other data communicated via the OBD port, etc.). Generally, the sensors 114 may be input/output devices separate from the capture device 102. The circuit 130 may be a display device (e.g., a LCD display). The display 130 may be implemented as an electronic mirror (e.g., an eMirror).

In some embodiments, the communication device 110 and/or the sensors 114 may be implemented as part of the camera system 100 (e.g., internal components of the camera system 100). In some embodiments, the communication device 110 and/or the sensors 114 may be components available to the camera system 100 (e.g., pre-installed components of a vehicle). In some embodiments, the camera system 100 may be implemented as a drop-in solution (e.g., installed as one component).

The capture device 102 may present a signal (e.g., VIDEO) to the processor 106. The interfaces 104a-104n may present various signals to the processor 106. The interface 104a is shown presenting a signal (e.g., INPUT) to the processor 106. The interface 104n is shown presenting a signal (e.g., STATUS) to the processor 106. Other signals may be presented to the processor 106 by the interfaces 104a-104n (e.g., from the communication device 110, from other components and/or from other connections). The number and/or types of signals presented by the various interfaces 104a-104n may be varied according to the design criteria of a particular implementation.

The interfaces 104a-104n may receive various inputs. For example, the interface 104a is shown receiving an input (e.g., USER). The input USER may be an instruction provided by a driver. Other types of input may be received by the interface 104a (e.g., signals generated by various components of a vehicle, signals received from sources external to a vehicle, etc.). In another example, the interface 104n is shown receiving input signals from the vehicle sensors 114. In yet another example, the interface 104n is shown communicating with the communication device 110. The types of input signals received by the interfaces 104a-104n may be varied according to the design criteria of a particular implementation.

The processor 106 may be configured to receive the signal VIDEO, the signal INPUT, the signal STATUS and/or other inputs. The processor 106 may be configured to generate a signal (e.g., VIDEO_OUT). The signal VIDEO_OUT may be generated based on a decision made by the processor 106. The decision made by the processor 106 may be determined based on the inputs received by the processor 106 (e.g., the signal INPUT, the signal STATUS and/or other inputs) and/or based on an analysis of the signal VIDEO. The signal VIDEO_OUT may be presented to the display 130. The signal VIDEO_OUT may be a cropped version of the signal VIDEO. The signal VIDEO_OUT may comprise one or more video frames (e.g., a series of video frames). The inputs, outputs and/or arrangement of the components of the camera system 100 may be varied according to the design criteria of a particular implementation.

The camera system 100 may be implemented as a regular digital camera and/or a depth-sensing camera. The sensors 114 may be implemented on-board the camera system 100 and/or connected externally (e.g., via the interface 104). The processor 106 may analyze the captured video content (e.g., the signal VIDEO) in real time to detect objects.

Figure 2:
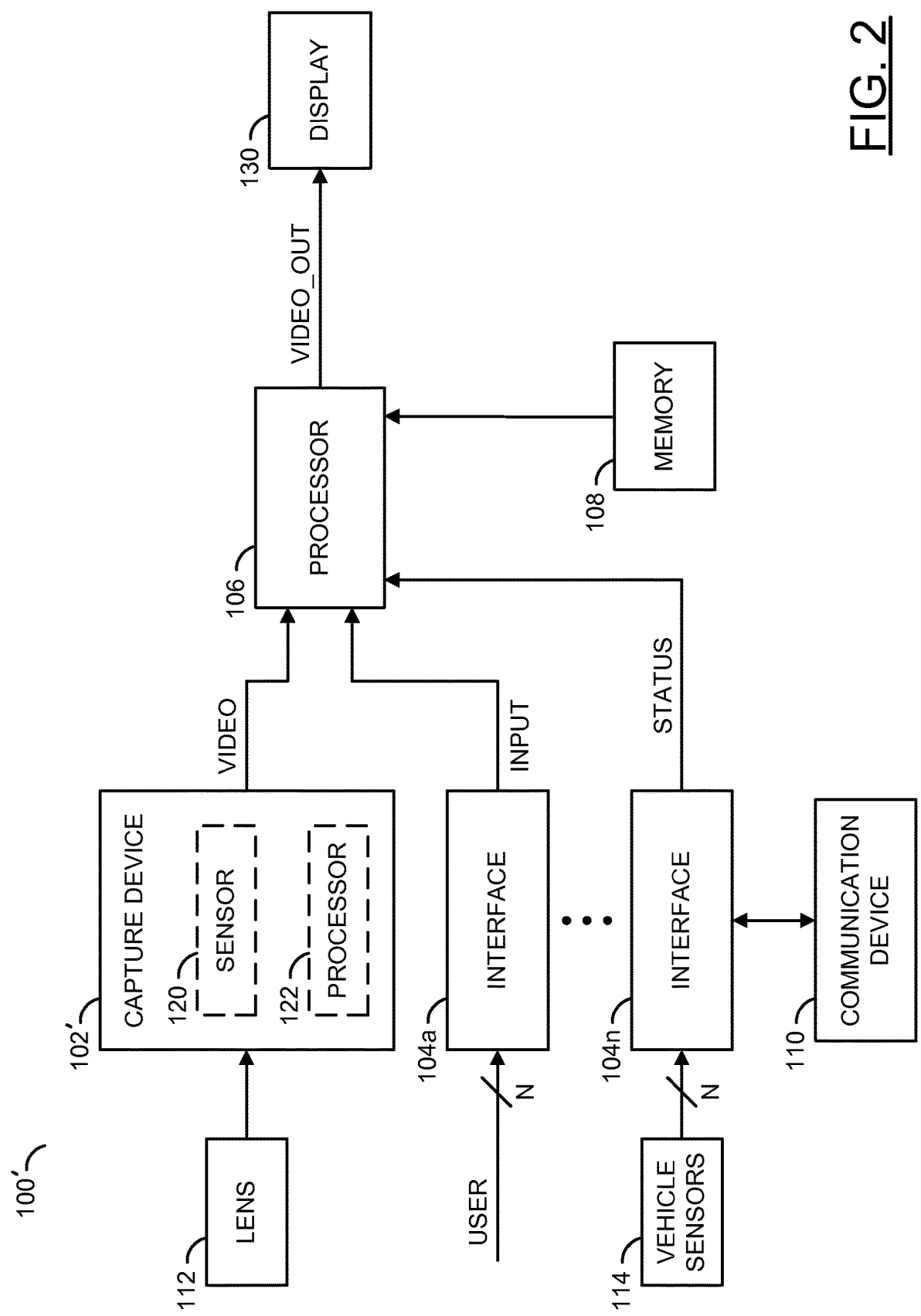
FIG. 2 is a block diagram of another example embodiment of an apparatus.

Referring to FIG. 2, a block diagram of an apparatus 100' is shown in accordance with an embodiment of the present invention. The camera system 100' may comprise the capture device 102', the interfaces 104a-104n, the processor 106, the memory 108, the communication device 110, the lens 112, the vehicle sensors 114 and/or the display 130. The camera system 100' may be a distributed system (e.g., each component may be implemented separately throughout an installation location such as a vehicle). The capture device 102' may comprise a block (or circuit) 120 and/or a block (or circuit) 122. The circuit 120 may be a camera sensor (e.g., a camera sensor separate from the sensors 114). The circuit 122 may be a processor (e.g., a processor separate from the processor 106). The capture device 102' may implement a separate internal memory (e.g., a memory separate from the memory 108 such as a frame buffer).

Figure 3:
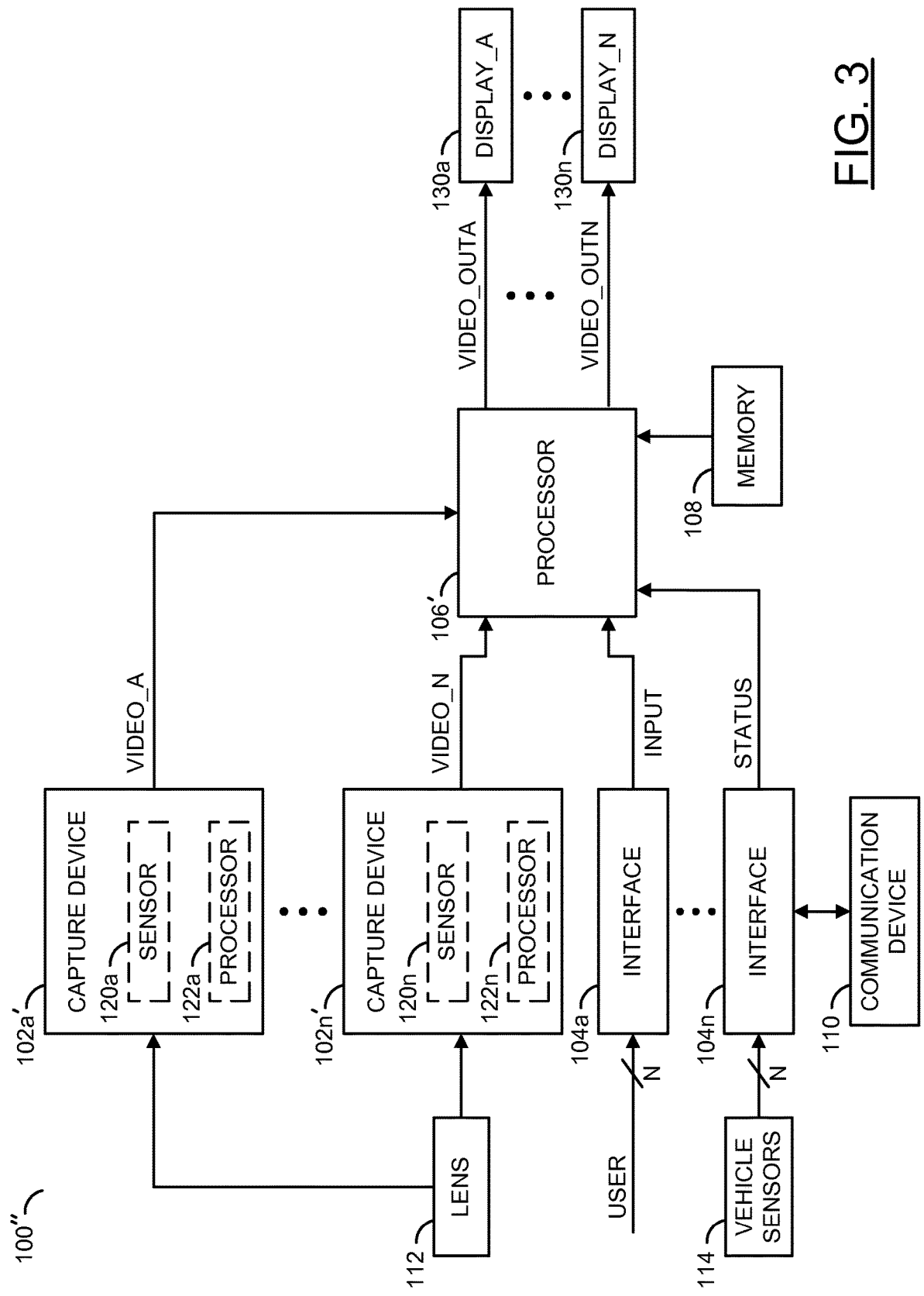
FIG. 3 is a block diagram of an example embodiment of an apparatus having multiple image sensors.

Referring to FIG. 3, a block diagram of an apparatus 100" is shown in accordance with an alternate embodiment. The apparatus 100" may comprise multiple capture devices 102a'-102n', the interfaces 104a-104n, the processor 106', the memory 108, the communication device 110, the lens 112, the vehicle sensors 114 and/or multiple displays 130a-130n. The multiple capture devices 102a'-102n' may each have a corresponding camera sensor 120a-120n. Each of the camera sensors 120a-120n may present a separate signal (e.g., VIDEO_A-VIDEO_N) to the processor 106'.

The processor 106' may be configured to receive various inputs from the interfaces 104a-104n (e.g., the signals STATUS, INPUT, etc.). The processor 106' may be configured to receive one or more video signals from the capture devices 102a'-102n' (e.g., VIDEO_A-VIDEO_N). The processor 106' may be configured to present corresponding output signals (e.g., VIDEO_OUTA-VIDEO_OUTN) for each of the received video signals VIDEO_A-VIDEO_N. The signals VIDEO_OUTA-VIDEO_OUTN may be presented to one or more displays 130a-130n.

Figure 4:
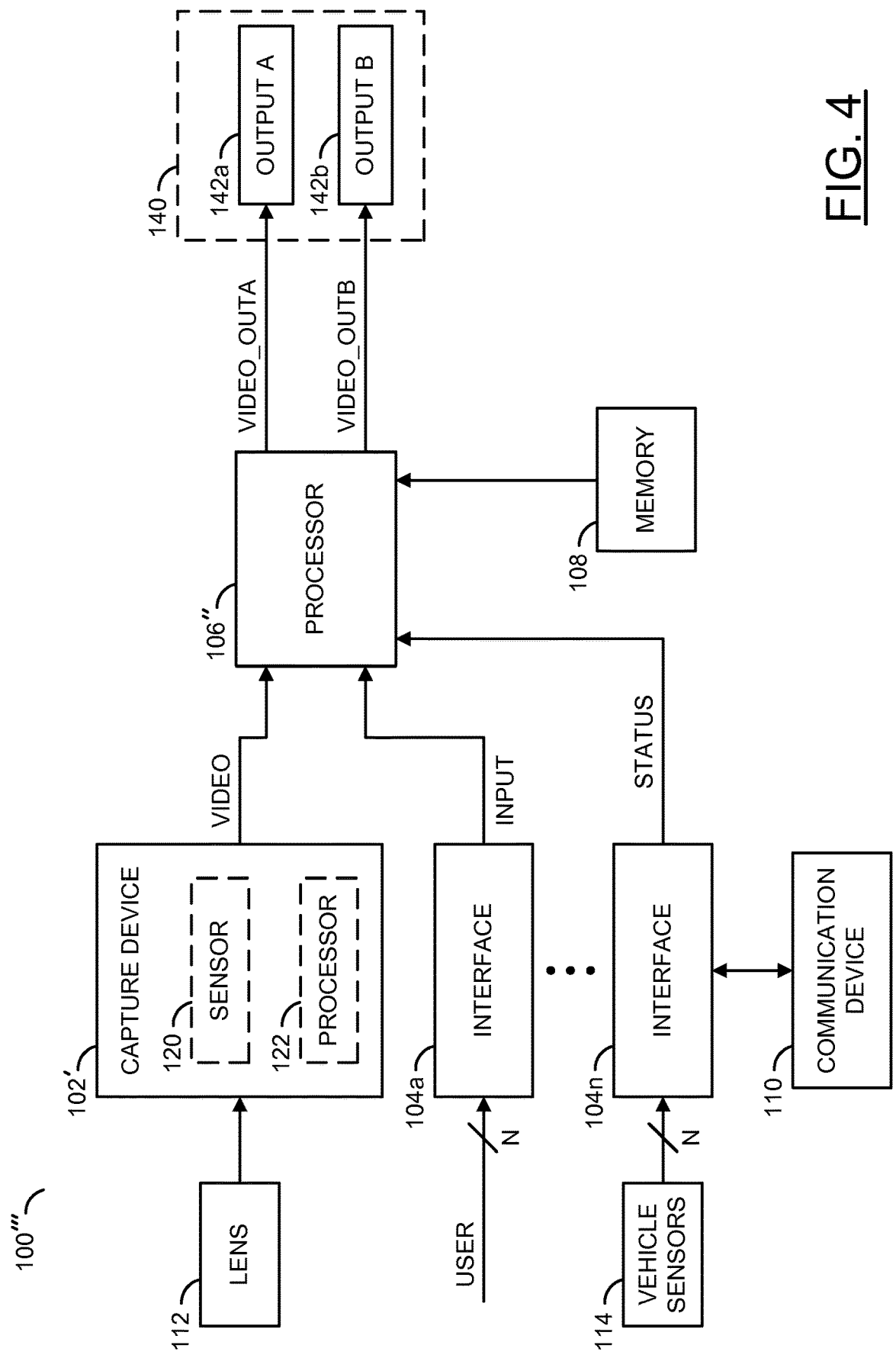
FIG. 4 is a block diagram of an example embodiment of an apparatus configured to present multiple output video signals.

Referring to FIG. 4, a block diagram of an apparatus 100''' is shown in accordance with an alternate embodiment. The camera system 100''' may comprise the capture device 102', the interfaces 104a-104n, the processor 106", the memory 108, the communication device 110, the lens 112, the vehicle sensors 114, and a block (or circuit) 140. The circuit 140 may be an output device. The apparatus 100''' may be configured to present multiple output video signals (e.g., VIDEO_OUTA and VIDEO_OUTB) in response to the single signal VIDEO received from the capture device 102'. The processor 106" may be configured to crop the signal VIDEO into two separate video output signals. For example, the signal VIDEO_OUTA may be a series of video frames with one field of view (e.g., a narrow field of view) and the signal VIDEO_OUTB may be a series of video frames with an alternate field of view (e.g., a wide field of view). The field of view of the output signals VIDEO_OUTA and VIDEO_OUTB may be varied according to the design criteria of a particular implementation.

The signals VIDEO_OUTA and VIDEO_OUTB may be presented to the output device 140. The output device 140 may comprise the blocks (or circuits 142a-142b). The circuits 142a-142b may be multiple outputs for the output device 140. Each of the signals VIDEO_OUTA-VIDEO_OUTB may be presented to the corresponding output 142a-142b. In some embodiments, the output device 140 may be the display device 130 (e.g., a LCD display implementing an electronic mirror) and the outputs 142a-142n may be a part (or portion) of the single display device 130 (e.g., a picture-in-picture arrangement). In some embodiments, the output device 140 may be an electronic mirror having multiple separate display devices. The outputs 142a-142b may be two separate displays (e.g., screens, panels, etc.). In some embodiments, the output device 140 may be a processor and the outputs 142a-142b may be pins of the processor 140. In some embodiments, the outputs 142a-142b may be separate devices (e.g., separate displays that are not part of the output device 140). The arrangement of the output device 140 and/or the outputs 142a-142b may be varied according to the design criteria of a particular implementation.

Figure 5:
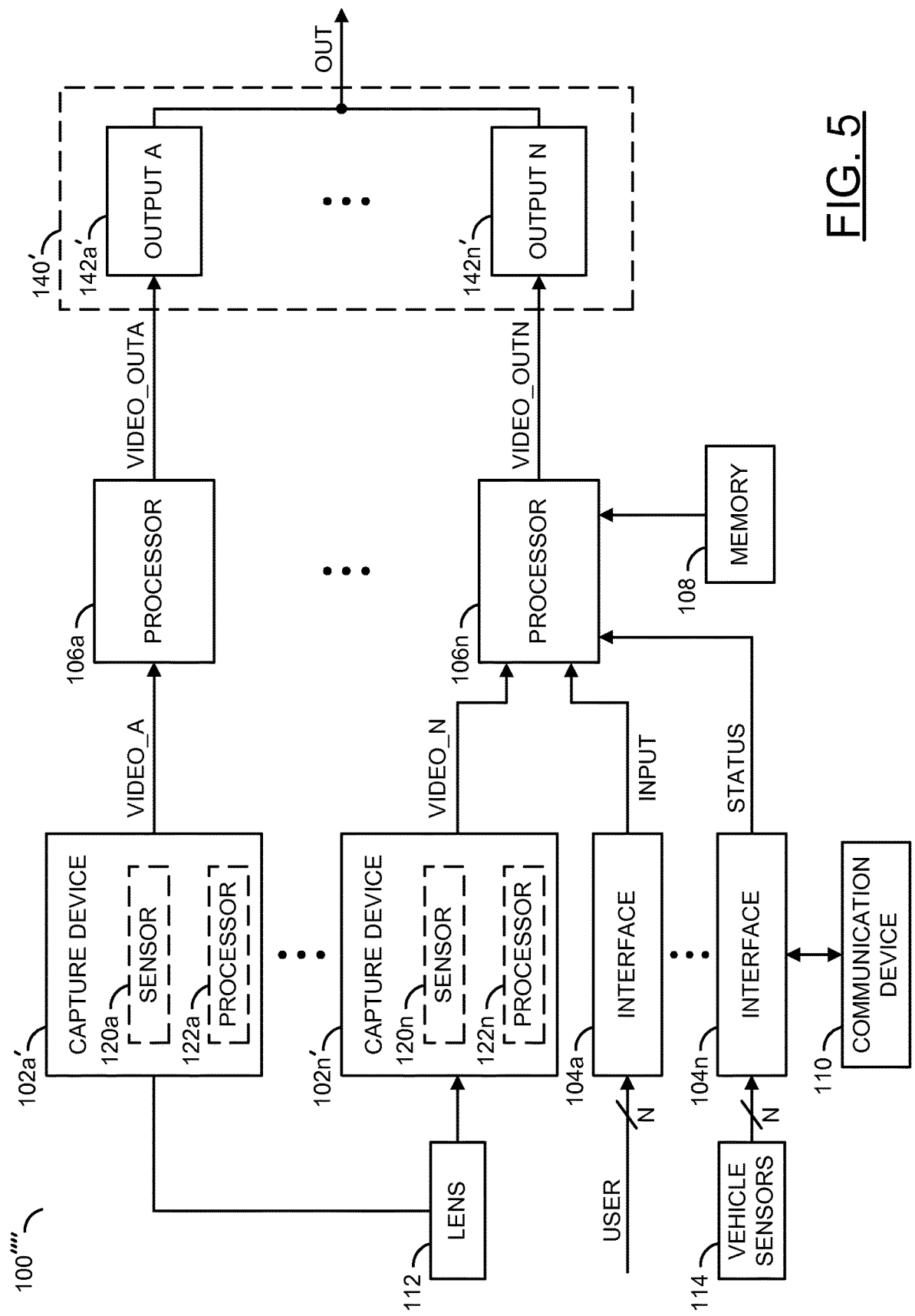
FIG. 5 is a block diagram of an example embodiment of an apparatus configured to have multiple image sensors and multiple processors.

Referring to FIG. 5, a block diagram of an apparatus 100'''' is shown in accordance with an alternate embodiment. The camera system 100'''' may comprise the capture devices 102a'-102n', the interfaces 104a-104n, multiple processors 106a-106n, the memory 108, the communication device 110, the lens 112 and the output device 140'. Each of the capture devices 102a'-102n' may generate a video signal (e.g., the video signals VIDEO_A-VIDEO_N). Each of the video signals VIDEO_A-VIDEO_N may be presented to a corresponding processor 106a-106n.

Each of the processors 106a-106n may generate a corresponding output signal (e.g., VIDEO_OUTA-VIDEO_OUTN). Each of the output signals VIDEO_OUTA-VIDEO_OUTN may be presented to the output device 140' (e.g., to one of the corresponding outputs 142a'-142n'). For example, the output device 140' may be a processor. The processor 140' may receive the signals VIDEO_OUTA-VIDEO_OUTN (e.g., via the outputs 142a'-142n'). For example, the outputs 142a'-142n' may be pins of the processor 140'. The processor 140' may be configured to merge the signals VIDEO_OUTA-VIDEO_OUTN. The merged signals VIDEO_OUTA-VIDEO_OUTN may be presented as a signal (e.g., OUT). The signal OUT may be presented to a display device such as an electronic mirror.

Figure 6:
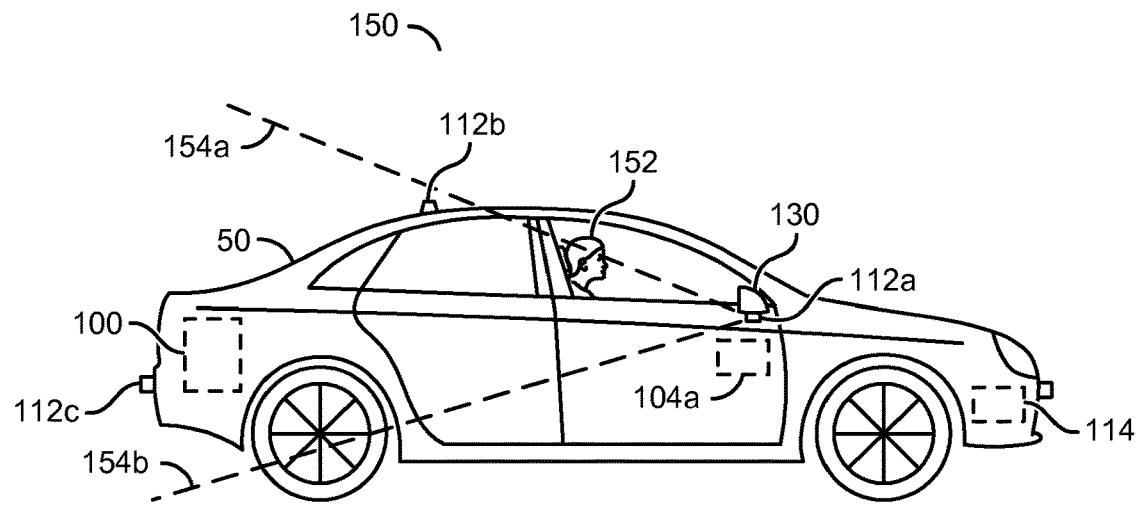
FIG. 6 is a diagram illustrating an external view of a vehicle.

Referring to FIG. 6, an embodiment 150 illustrating the camera system 100 implemented in an automobile/vehicle 50 is shown. The camera system 100 is shown inside the vehicle 50. A driver 152 is shown seated in the vehicle 50. A side view mirror 130 is shown attached to the vehicle 50. The side view mirror 130 may be the display device (e.g., electronic mirror) 130. The vehicle sensors 114 are shown on (or in) the vehicle 50. The interface 104a is shown in the vehicle 50.

In the embodiment 150, the electronic mirror 130 is shown on the exterior of the vehicle 50. In some embodiments, the electronic mirror 130 may be implemented as part of the interior of the vehicle 50 (e.g., as part of a door panel, as part of a dashboard, mounted above a windshield, etc.). The location of the electronic mirror 130 may be varied according to the design criteria of a particular implementation.

In the embodiment 150, the lens 112a is shown attached to the electronic mirror 130. The lens 112a is shown capturing a targeted view from the vehicle 50. The targeted view is shown as lines 154a and 154b. The targeted view 154a-154b is shown directed towards the rear of (e.g., behind) the vehicle 50. The targeted view 154a-154b may be implemented to capture a view similar (e.g., emulating) a reflective view from a conventional (e.g., reflective) side-view mirror.

In some embodiments, the lens 112 may be located on another portion of the vehicle 50 (e.g., a rear bumper, attached to the driver and/or passenger side door, on the roof of the vehicle 50, etc.). In one example, the lens 112b is shown positioned above a back windshield of the vehicle 50 (e.g., roughly where an antenna fin is commonly positioned on various vehicle makes and models). In another example, the lens 112c is shown positioned on the rear bumper of the vehicle 50. The lenses 112b-112c may capture similar targeted views from the vehicle 50 as the lens 112a. The lenses 112a-112c may implement a rear-facing camera. The location of the lens 112 may be varied according to the design criteria of a particular implementation.

The camera system 100 is shown in the rear of the vehicle 50. The particular location of the camera system 100 may be varied according to the design criteria of a particular implementation. For example, in some embodiments, the vehicle 50 may allow an installation of the camera system 100 in a rear end of the vehicle 50. In other embodiments, the vehicle 50 may allow an installation of the camera system 100 in a front end of the vehicle 50. For example, the camera system 100 may be installed near and/or along with the interface 104a (e.g., in a dashboard of the vehicle 50). In another example, the camera system 100 (or the distributed camera system 100') may be distributed throughout the vehicle 50 (e.g., connections may be implemented between the camera system 100, the capture device 102 and/or the interfaces 104a-104n such as a direct wired connection and/or a connection using a common bus line).

The electronic mirror 130 may be a screen and/or an output device. The electronic mirror 130 may be operational in combination with the capture device 102 and/or the processor 106. The electronic mirror 130 may display a version of video frames (e.g., the targeted view from the vehicle 50) captured by one or more of the lenses 112a-112c and/or the capture device 102. The video frames captured by the lenses 112a-112c and/or the capture device 102 may be cropped, adjusted and/or encoded by the processor 106. The cropped, adjusted and/or encoded video frames may be displayed by the electronic mirror 130. For example, the processor 106 may provide real-time video streaming to the electronic mirror 130.

Generally, a field of view displayed on the electronic mirror 130 may be selected by the driver 152 using manual controls in the vehicle 50 available to the driver 152 via the interface 104a (e.g., buttons on a panel on the inside of the door beside the driver 152, buttons on a center console, an interface on a touchscreen, buttons on a steering wheel, etc.). For example, the decision made by the processor 106 to determine the field of view to select may be based on the input by the driver 152. The camera system 100 may select the field of view displayed on the electronic mirror 130 based on the field of view selected by the driver 152 (e.g., the signal INPUT). In some embodiments, the camera system 100 may select the field of view to display on the electronic mirror 130 based on status information from the vehicle 50 (e.g., the signal STATUS). For example, the decision made by the processor 106 to determine the field of view to select may be automated based on the status information from the vehicle 50. Selecting between the fields of view may provide video frames to the electronic mirror 130 that provide the driver 152 alternate viewing angles and/or widths.

The camera system 100 may be configured to analyze the captured video signal. The camera system 100 may detect objects in the captured video signal (e.g., automobiles, bicycles, pedestrians, animals, etc.). The camera system 100 may be configured to determine an absolute location and/or a relative location of the detected objects. Based on the detected objects, the processor 106 may determine a position (e.g., a distance) of the objects relative to the vehicle 50. If the detected objects are determined to be in a blind spot of the driver 152 (e.g., an estimated blind spot of the driver 152), the camera system 100 may present an input to the processor 106. The input may be used to select one of the fields of view to be displayed on the electronic mirror 130.

The vehicle sensors 114 are shown attached to (or in) the vehicle 50. Multiple types of the vehicle sensors 114 may be implemented. The vehicle sensors 114 may be used to determine the status information (e.g., the signal STATUS). In some embodiments, the vehicle sensors 114 may communicate with an OBD port of the vehicle 50. For example, the vehicle sensors 114 may monitor a direction of the steering wheel. The direction of the steering wheel may be used to determine which field of view to display on the electronic mirror 130. In another example, turn signals may be monitored. The activation of the turn signals by the driver 152 may indicate which direction the vehicle 50 may be moving. The direction of the vehicle may be used to select an appropriate field of view to display on the electronic mirror 130.

The interface 104a may be located near the driver 152 (e.g., in a dashboard of the vehicle 50, as buttons on the steering wheel, options on a touchscreen display of an infotainment unit, buttons on a center console, etc.). The interface 104a may be used by the driver 152 to select between the fields of view to be displayed on the electronic mirror 130. For example, the interface 104a may be a single button. The single button may be used to select between a default field of view and another field of view (e.g., allow the driver 152 to quickly peek using the alternate field of view).

In another example, the interface 104a may be multiple buttons providing multiple (e.g., pre-configured) fields of view to display on the electronic mirror 130. For example, the driver 152 may select favorite fields of view and save the fields of view as pre-configured options. In yet another example, the interface 104a may implement voice recognition to allow the driver 152 to speak a command to switch between the various fields of view. The implementation of the interface 104a may be varied according to the design criteria of a particular implementation. The interface 104a may provide the signal INPUT to the processor 106.

The vehicle sensors 114 may be configured as a blind-spot detection system. The sensors 114 may be implemented using proximity detection technology. Blind-spot detection systems may implement more than one sensor. For example, blind-spot detection systems may use multiple radars and/or sonars. The sensor array may be used to determine the position of objects in close proximity to the vehicle 50. For example, the vehicle sensors 114 may implement a radar device, an array of radars, a sonar device, an array of sonars, a LIDAR device, an array of LIDAR devices, an ultra-sound device, an array of ultra-sound devices, etc. The sensors 114, the processor 106 and/or one or more capture devices (e.g., a capture device directed towards the driver 152) may be used to estimate the blind spot and/or possible blind zones of the driver 152. The types of the vehicle sensors 114 used to detect a proximity to other objects may be varied according to the design criteria of a particular implementation.

Figure 7:
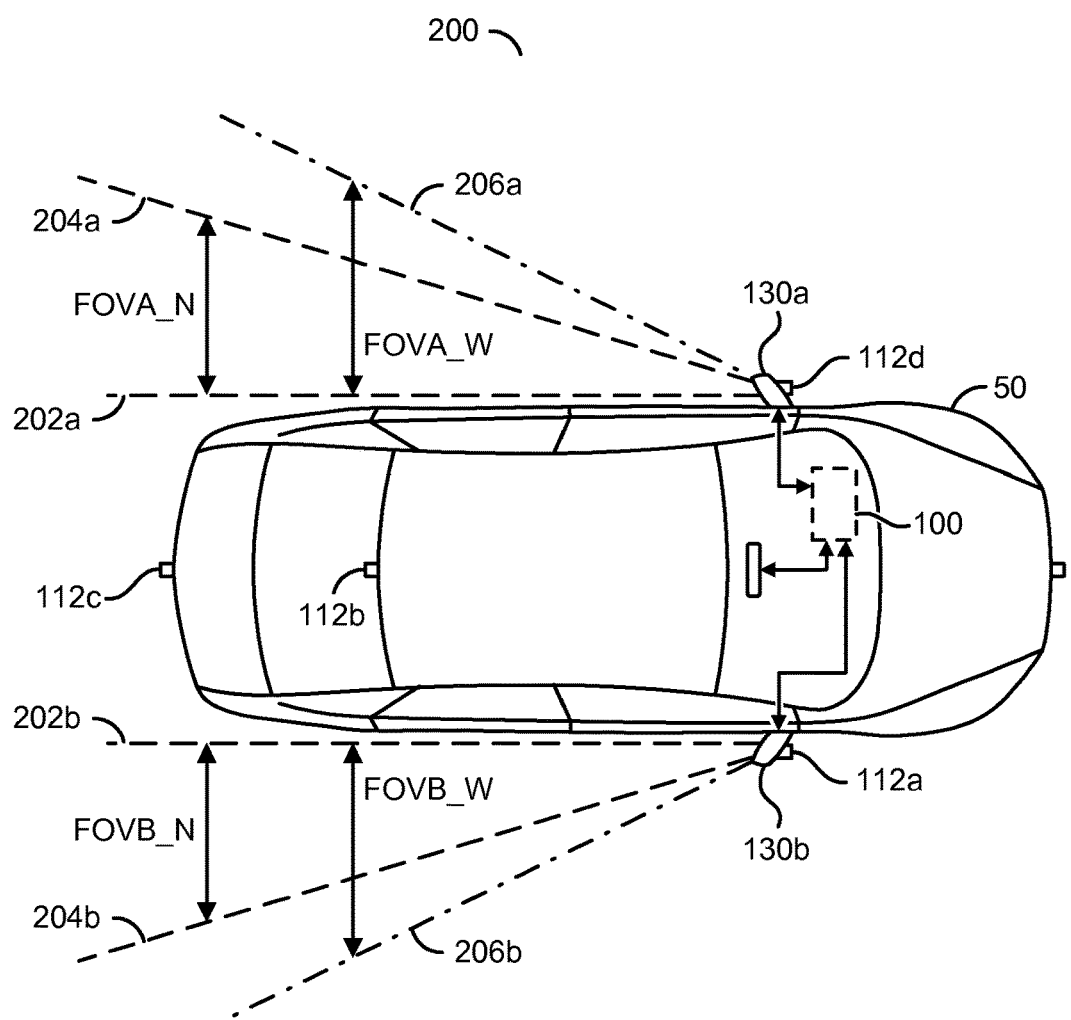
FIG. 7 is a diagram illustrating wide and narrow fields of view.

Referring to FIG. 7, an embodiment 200 illustrating a wide field of view (e.g., FOVA_W) and a narrow field of view (e.g., FOVA_N) is shown. The fields of view FOVA_W and FOVA_N are shown displayed from the electronic mirror 130a. The field of the view may represent a measure of a size/width of a view. The narrow field of view FOVA_N may be a view between a line 202a and a line 204a. The wide field of view FOVA_W may be a view between the line 202a and a line 206a.

The field of view FOVA_N may have a corresponding field of view (e.g., FOVA_N) from the electronic mirror 130b. Similarly, the field of view FOVA_W may have a corresponding field of view (e.g., FOVB_W) from the electronic mirror 130b. The field of view FOVA_N and the field of view FOVB_N are shown having a similar coverage. However, the coverage of the field of view FOVA_N and FOVB_N may be the same, or may be different. Similarly, the field of view FOVA_W and FOVB_W may have a similar coverage, or may have a different coverage. In particular, the view that a driver sees from the electronic mirror 130a may be designed to be slightly different than the view seen by the driver 152 from the electronic mirror 130b.

The fields of view FOVA_N, FOVA_W, FOVB_N and/or FOVB_W may be presented to the displays 130a and/or 130b by the camera system 100. For example, the fields of view FOVA_N, FOVA_W, FOVB_N and/or FOVB_W may be displayed based on the signal VIDEO_OUT, generated by the processor 106. Selecting between the fields of view FOVA_N, FOVA_W, FOVB_N and/or FOVB_W may be based on a decision made by the processor 106.

In some embodiments, the decision made by the processor 106 may be based on the driver 152 selecting which of the fields of view FOVA_N and/or FOVA_W are displayed on the electronic mirror 130a (e.g., using the interface 104a). In some embodiments, the decision made by the processor 106 may be based on the status information (e.g., the processor 106 may automatically select which of the fields of view FOVA_N and/or FOVA_W are displayed on the electronic mirror 130a based on the status information). In some embodiments, the decision made by the processor 106 may be based on the objects detected in the signal VIDEO (e.g., the processor 106 may select which of the fields of view FOVA_N and/or FOVA_W are displayed on the electronic mirror 130a based on the objects detected in the signal VIDEO).

Figure 8:
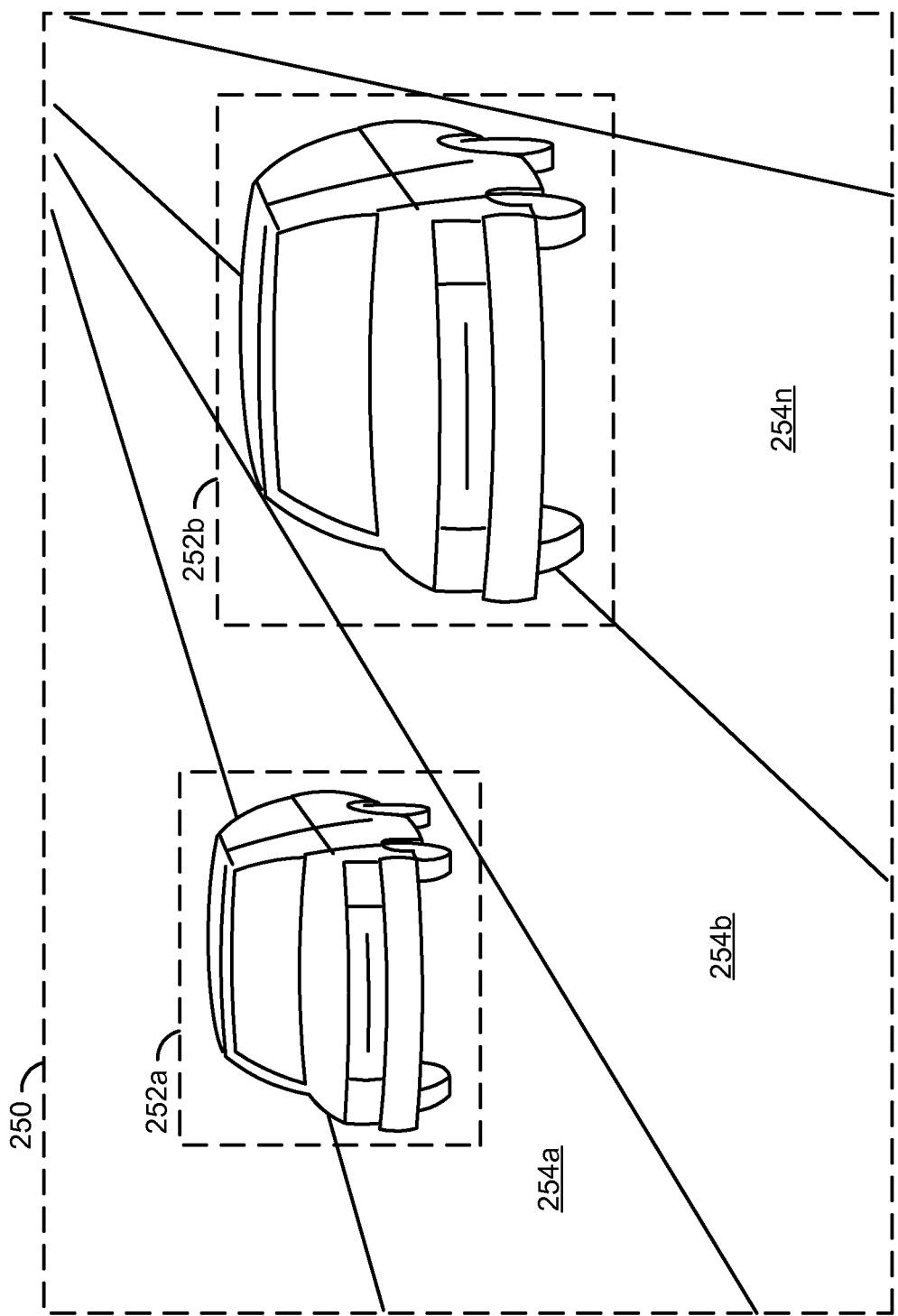
FIG. 8 is a diagram illustrating an example video frame.

Referring to FIG. 8, an example video frame 250 is shown. The frame 250 may represent a targeted view from the vehicle 50 captured by the capture device 102. The frame 250 shows a vehicle 252a and a vehicle 252b. The vehicles 252a-252b are shown as objects detected by the processor 106. The vehicle 252a may be traveling in a lane 254a. The vehicle 252b may be traveling in a lane 254n. The frame 250 may be one of the frames of the signal VIDEO captured by the capture device 102 (e.g., via the lens 112). The frame 250 is generally wide enough to show both the vehicle 252a and the vehicle 252b. The processor 106 will determine which portions of the frame 250 to present on the display 130 (or 130a-130n, or output device 140).

The capture device 102 may be configured to capture video image data (e.g., from the lens 112). In some embodiments, the capture device 102 may be a video capturing device such as a camera. In some embodiments, the capture device 102 may be a component of a camera (e.g., a camera pre-installed at a fixed location such as a security camera). The capture device 102 may capture data received through the lens 112 to generate a bitstream (e.g., generate video frames). For example, the capture device 102 may receive light from the lens 112. The lens 112 may be directed, panned, zoomed and/or rotated to provide a targeted view from the vehicle 50 (e.g., a field of view).

The capture device 102 may transform the received light into digital data (e.g., a bitstream). In some embodiments, the capture device 102 may perform an analog to digital conversion. For example, the capture device 102 may perform a photoelectric conversion of the light received by the lens 112. The capture device 102 may transform the bitstream into video data, a video file and/or video frames (e.g., perform encoding). For example, the video data may be a digital video signal. The digital video signal may comprise video frames (e.g., sequential digital images).

The video data of the targeted view of the vehicle 50 may be represented as the signal/bitstream/data VIDEO (e.g., a digital video signal). The capture device 102 may present the signal VIDEO to the processor 106. The signal VIDEO may represent the video frames/video data (e.g., the video frame 250). The signal VIDEO may be a video stream captured by the capture device 102. In some embodiments, the capture device 102 may be implemented in the camera. In some embodiments, the capture device 102 may be configured to add to existing functionality of the camera.

In some embodiments, the capture device 102 may be pre-installed at a pre-determined location and the camera system 100 may connect to the capture device 102. In other embodiments, the capture device 102 may be part of the camera system 100. The capture device 102 may be configured for blind spot monitoring, security monitoring, driver assistance, for insurance purposes, etc. For example, the capture device 102 may be implemented to detect break-ins and/or vandalism. In another example, the capture device 102 may detect accidents to provide evidence for insurance claims.

The capture device 102 may be configured to detect objects and classify the objects as a particular type of object (e.g., a vehicle, a bicycle, a pedestrian, etc.). The camera system 100 may be configured to leverage pre-existing functionality of the pre-installed capture device 102. The capture device 102 may be configured to perform depth sensing. The implementation of the capture device 102 may be varied according to the design criteria of a particular implementation.

In some embodiments, the capture device 102' may implement the camera sensor 120 and/or the processor 122. The camera sensor 120 may receive light from the lens 112 and transform the light into digital data (e.g., the bitstream). For example, the camera sensor 120 may perform a photoelectric conversion of the light from the lens 112. The processor 122 may transform the bitstream into a human-legible content (e.g., video data). For example, the processor 122 may receive pure (e.g., raw) data from the camera sensor 120 and generate (e.g., encode) video data based on the raw data (e.g., the bitstream). The capture device 102' may have a memory to store the raw data and/or the processed bitstream. For example, the capture device 102' may implement a frame memory and/or buffer to store (e.g., provide temporary storage and/or cache) one or more of the video frames (e.g., the digital video signal). The processor 122 may perform analysis on the video frames stored in the memory/buffer of the capture device 102'.

In some embodiments the capture device 102' may be configured to determine a location of the objects detected in the video frame 250 (e.g., the vehicles 252a-252b). For example, the processor 122 may analyze the captured bitstream (e.g., using machine vision processing), determine a location of the detected objects and present the signal VIDEO (e.g., comprising information about the location of the detected vehicles 252a-252b) to the processor 106. The processor 122 may be configured to determine the location of the detected objects (e.g., less analysis is performed by the processor 106). In another example, the processor 122 may generate the signal VIDEO comprising video frames and the processor 106 may analyze the video frames to determine the location of the detected objects (e.g., more analysis is performed by the processor 106). The analysis performed by the processor 122 and/or the processor 106 may be varied according to the design criteria of a particular implementation.

The interfaces 104a-104n may receive data from one or more components of the vehicle 50, the driver 152 and/or other components of the camera system 100 (e.g., the communication device 110). The signal STATUS may be generated in response to the data received from the components of the vehicle 50. In some embodiments, the interface 104a may receive data from the driver 152. The signal INPUT may be generated in response to input from the driver 152. In some embodiments, the interfaces 104a-104n may receive data from the processor 106 (e.g., in response to objects detected by the processor in the signal VIDEO). The interfaces 104a-104n may send data (e.g., instructions) from the processor 106 to the components of the vehicle 50. For example, the interfaces 104a-104n may be bi-directional.

In the example shown, the data received by the interface 104n may be the status information (e.g., presented to the processor 106 as the signal STATUS). In the example shown, the data received by the interface 104n from the components of the vehicle 50 may be a turn signal indicator, a position of the steering wheel, an angle of the bottom seat cushion, a mirror orientation, a speed of the vehicle, any information available from an on-board diagnostics (OBD) port of the vehicle 50, etc. (e.g., presented to the processor 106 as the signal STATUS). The type of data and/or the number of components of the vehicle 50 that provide data may be varied according to the design criteria of a particular implementation.

In the examples shown (e.g., in FIGS. 1-5), information from the vehicle sensors 114 (e.g., the location module, the orientation module, the temperature module, etc.) may be received by the interfaces 104a-104n. In one example, where the camera system 100 is installed in a vehicle, the interfaces 104a-104n may be implemented as an electronic bus (e.g., a controller area network (CAN) bus) and the sensors 114 may be part of the vehicle. In another example, the interfaces 104a-104n may be implemented as an Ethernet interface. In yet another example, the interfaces 104a-104n may be implemented as an electronic device (e.g., a chip) with a CAN bus controller. In still another example, the interfaces 104a-104n may be provided for human interaction (e.g., buttons, speech detection, etc.). In some embodiments, the sensors 114 may connect directly to the processor 106 (e.g., the processor 106 may implement a CAN bus controller for compatibility, the processor 106 may implement a serial peripheral interface (SPI), the processor 106 may implement another interface, etc.). In some embodiments, the sensors 114 may connect to the memory 108.

The processor 106 may be configured to execute computer readable code and/or process information. The processor 106 may be configured to receive input and/or present output to the memory 108. The processor 106 may be configured to present and/or receive other signals (not shown). The number and/or types of inputs and/or outputs of the processor 106 may be varied according to the design criteria of a particular implementation.

In some embodiments, the processor 106 may receive the signal VIDEO from the capture device 102 and detect the objects in the video frame 250. In some embodiments, the processor 122 may be configured to detect the objects and the processor 106 may receive the location (or coordinates) of the detected objects in the video frame 250 from the capture device 102'. In some embodiments, the processor 106 may be configured to analyze the video frame 250 (e.g., the signal VIDEO). The processor 106 may be configured to detect a location and/or position of the detected in the video frame.

Based on the location and/or the classification of the detected objects in the video frame 250 (e.g., the signal VIDEO), the processor 106 may generate a signal (e.g., an input used by the processor 106 to select between one or more available fields of view). The processor 106 may make a decision based on the signal VIDEO (e.g., whether the detected objects are in an estimated blind spot of the driver 152). The processor 106 may generate the signal VID- EO_OUT in response to the input and/or the decision made in response to the detected objects (e.g., the detected objects, the signal STATUS, the signal INPUT, etc.).

The signal VIDEO_OUT may be generated to provide an output for the electronic mirror 130 (or 140) in response to the captured video frames (e.g., VIDEO) and one or more input signals (e.g., STATUS, INPUT, detected objects, etc.). For example, the input USER may be sent to the processor 106 via the interface 104a in order to select between the various fields of view (e.g., FOVA_N, FOVA_W, etc.). Generally, the signal VIDEO_OUT may correspond to the type of input received by the processor 106.

The cropping performed by the processor 106 may be varied according to the design criteria of a particular implementation. For example, the signal VIDEO_OUT may be processed (e.g., cropped) to fit the shape of the electronic mirror 130 and/or to emulate a reflective view from a conventional reflective mirror (e.g., a side view mirror, a rear view mirror, etc.). For example, the electronic mirror 130 may emulate the reflective view from a conventional reflective mirror as seen from the point of view (or estimated point of view) of the driver 152 by implementing real-time video streaming of the signal VIDEO_OUT received from the processor 106. Generally, the signal VIDEO_OUT is some view (or derivative of some view) captured by the capture device 102 (e.g., the video frame 250. In some embodiments, the signal VIDEO_OUT may provide a series of video frames that improves upon the reflective view from a conventional reflective mirror (e.g., provides night vision, provides more viewing area, highlights detected objects, provides additional data such as a numerical distance of detected objects, etc.).

The processor 106 and/or the processor 122 may be implemented as an application specific integrated circuit (e.g., ASIC) or a system-on-a-chip (e.g., SOC). The processor 106 and/or the processor 122 may be configured to determine a current size, shape and/or color of the objects. The processor 106 and/or the processor 122 may detect one or more of the detected objects in each video frame. In some embodiments, the processor 106 and/or the processor 122 may receive video signals from multiple cameras and/or image sensors (e.g., the capture device 102a'-102n').

The processor 106 and/or the processor 122 may determine a number of pixels (e.g., a width, a height and/or a depth) comprising the detected objects in the video frame 250. Based on the number of pixels of each of the detected objects 156a-156n in the video frame 250, the processor 106 and/or the processor 122 may estimate a distance of the objects from the vehicle 50. Whether the detection of the objects is performed by the processor 106 and/or the processor 122 may be varied according to the design criteria of a particular implementation.

The memory 108 may store data. The memory 108 may be implemented as a cache, flash memory, DRAM memory, etc. The type and/or size of the memory 108 may be varied according to the design criteria of a particular implementation. The data stored in the memory 108 may correspond to the detected objects, reference objects, a video file, status information (e.g., readings from the sensors 114, pre-selected fields of view, user preferences, user inputs, etc.) and/or metadata information.

For example, the memory 108 may store a reference size (e.g., the number of pixels of a particular object of known size in a video frame at a known distance) of particular objects. The reference size of particular objects stored in the memory 108 may be used to compare the current size of the detected objects in a current video frame. The comparison of the size of the detected objects in the current video frame and the reference size may be used to determine the location coordinates of the objects.

The memory 108 may store the pre-determined location of the camera system 100 and/or a pre-determined field of view of the camera system 100 (e.g., when the camera system 100 is implemented as a fixed view camera). In another example, the memory 108 may store previously captured frames (e.g., a reference image to determine a movement direction of the vehicles 252a-252b). The type of reference information stored by the memory 108 may be varied according to the design criteria of a particular implementation.

The communication device 110 may send and/or receive data to/from the interfaces 104a-104n. In some embodiments, when the camera system 100 is implemented as a vehicle camera, the communication device 110 may be the OBD of the vehicle. In some embodiments, the communication device 110 may be implemented as a satellite (e.g., a satellite connection to a proprietary system). In one example, the communication device 110 may be a hard-wired data port (e.g., a USB port, a mini-USB port, a USB-C connector, HDMI port, an Ethernet port, a DisplayPort interface, a Lightning port, etc.). In another example, the communication device 110 may be a wireless data interface (e.g., Wi-Fi, Bluetooth, ZigBee, cellular, etc.).

The lens 112 (e.g., a camera lens) may be directed to provide a targeted view from the vehicle 50 and/or of the environment (e.g., a field of view from the camera sensor 102 and/or an external camera sensor). In one example, the lens 112 may be mounted on a rear dashboard of the vehicle 50. In another example, the lens 112 may be on the side view mirror 130 and/or on a rear end of the vehicle 50. The lens 112 may be aimed to capture environmental data (e.g., light). The lens 112 may be configured to capture and/or focus the light for the capture device 102. Generally, the sensor 120 is located behind the lens 112. Based on the captured light from the lens 112, the capture device 102 may generate a bitstream and/or video data.

The sensors 114 may be configured to determine a location and/or an orientation of the camera system 100. The number and/or types of data used to determine the location and/or orientation of the camera system 100 may be varied according to the design criteria of a particular implementation. In one example, the location module may be used to determine an absolute location of the camera system 100. In another example, the orientation module may be used to determine an orientation of the camera system 100. Other types of sensors may be implemented. The sensors 114 may be used to determine a relative position of the vehicle 50 with respect to the vehicles 252a-252b.

Data from the sensors 114 may be presented to the processor 106 as the signal STATUS. The number and/or types of the sensors 114 may be varied according to the design criteria of a particular implementation. The sensors 114 may be used by the camera system 100 to determine a movement direction of the vehicle (e.g., using information from turn signals of the vehicle 50 being activated and/or a movement direction and amount of movement of a steering wheel of the vehicle 50).

The sensors 114 (e.g., the location module, the orientation module and/or the other types of sensors) may be configured to determine an absolute location and/or an azimuth orientation of the camera system 100. The absolute location and/or the azimuth orientation of the camera system 100 may be added to the relative location of the detected objects (e.g., 252a-252b) to determine an absolute location (e.g., coordinates) of the objects.

The absolute location of the vehicle 50 and/or the absolute location of the objects may be used to determine whether objects are in a blind zone of the driver 152.

The signal STATUS may provide information for the camera system 100 (e.g., the status information). In one example, location information may be determined by the location module (e.g., to determine weather conditions and/or road conditions for the current location of the vehicle 50). For example, the location module may be implemented as a GPS sensor. Orientation information may be determined by the orientation module. For example, the orientation module may be implemented as a magnetometer, an accelerometer and/or a gyroscope. In yet another example, temperature information may be determined by the temperature module. For example, the temperature module may be implemented as a thermometer.

The types of sensors used to implement the location module, the orientation module, the temperature module and/or any other types of sensors may be varied according to the design criteria of a particular implementation. In some embodiments, the signal STATUS may provide details about the camera system 100 (e.g., camera specifications, camera identity, the field of view 204, date, time, etc.).

Figure 9:
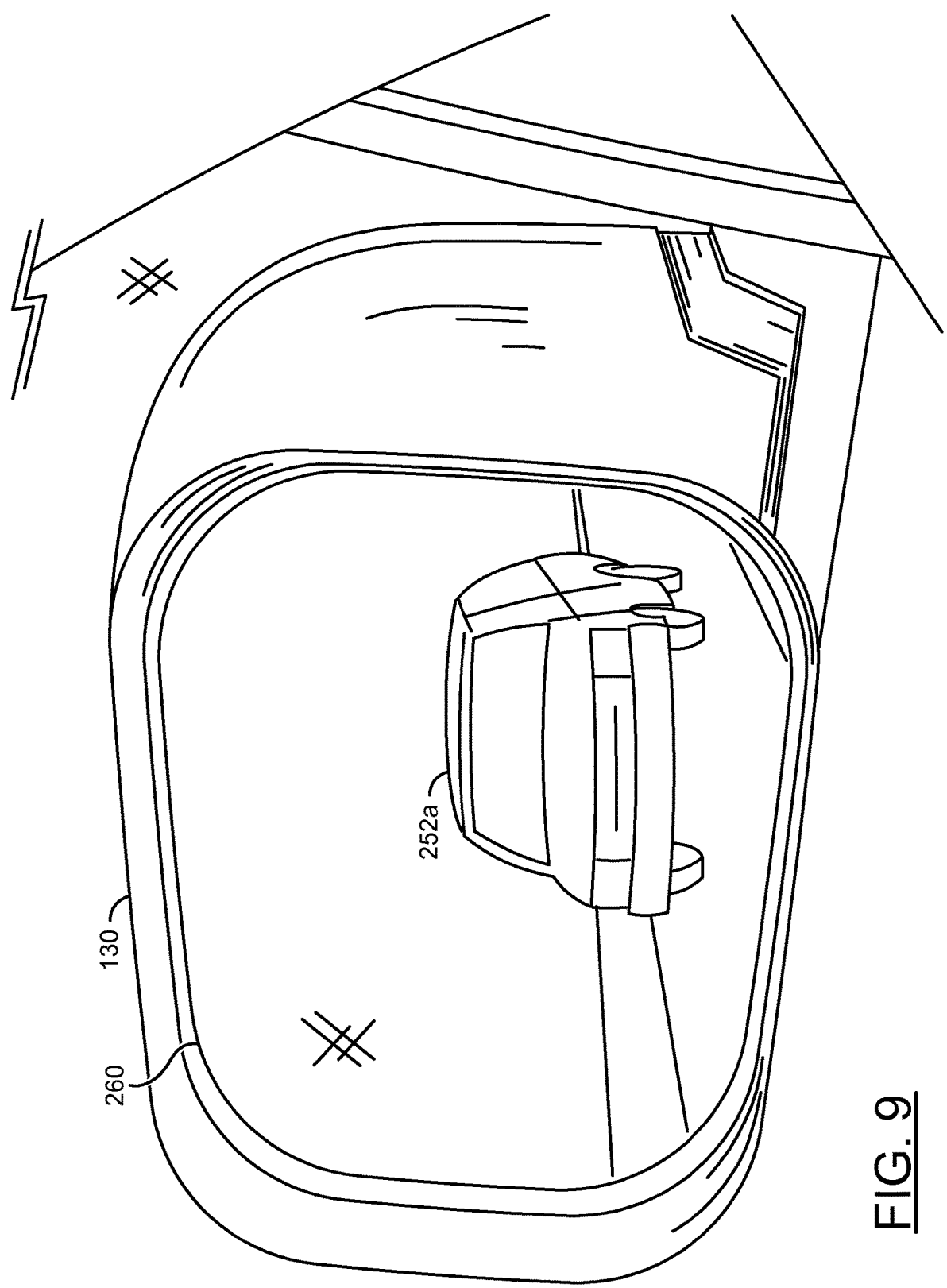
FIG. 9 is a diagram illustrating the electronic mirror displaying a narrow field of view.

Referring to FIG. 9, the electronic mirror 130 displaying the narrow field of view FOVA_N (or FOVB_N) is shown. The electronic mirror 130 is shown presenting an image 260 that includes the vehicle 252a. The image 260 may be one example frame of a series of video frames. The image 260 may be a portion of the captured frame 250 that includes the narrow field of view FOVA_N (or FOVB_N). For example, the image 260 may be a cropped version of the captured frame 250.

In the narrow field of view image 260, the vehicle 252b may not be visible (e.g., the vehicle 252b may be in the blind spot of the driver 152). In the narrow field of view image 260, the vehicle 252a may be visible and a size of the vehicle 252a may more accurately represent the distance of the vehicle 252a from the vehicle 50 (e.g., close to the same size as the vehicle 252a in the captured frame 250). In some embodiments, the narrow field of view image 260 may be the default field of view displayed by the electronic mirror 130.

Figure 10:
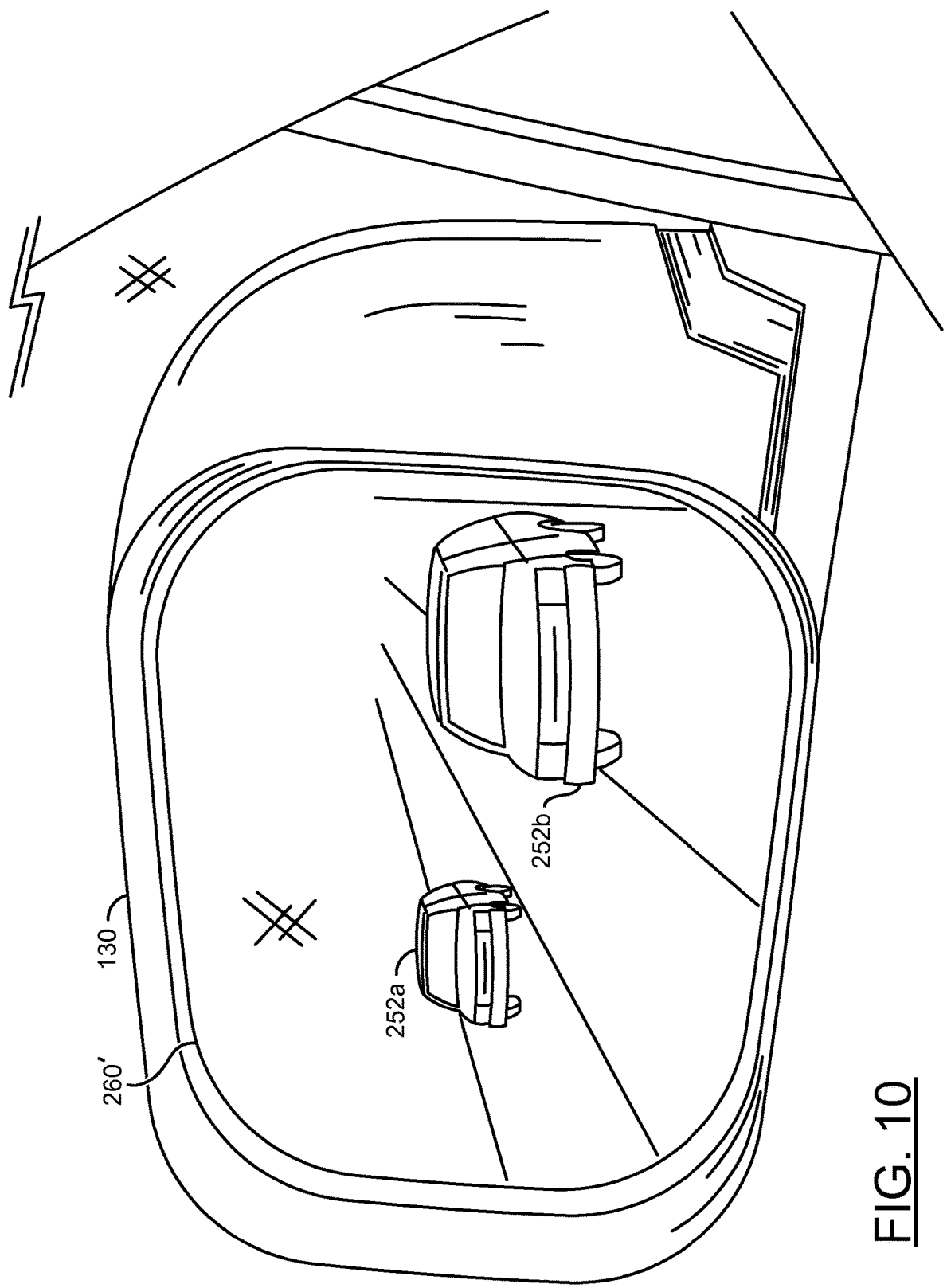
FIG. 10 is a diagram illustrating the electronic mirror displaying a wide field of view.

Referring to FIG. 10, the electronic mirror 130 displaying the wide field of view FOVA_W (or FOVB_W) is shown. The electronic mirror 130 is shown presenting an image 260' that includes the vehicle 252a and the vehicle 252b. The image 260' may be one example frame of a series of video frames. The image 260' may be a portion of the captured frame 250 that includes the field of view FOVA_W (or FOVB_W). For example, the image 260' may be a version of the captured frame 250 cropped by the processor 106.

In the wide field of view image 260', the vehicle 252a and the vehicle 252b may be visible. For example, the wide field of view image 260' may allow the driver 152 to see the vehicle 252b that is in the blind spot of the driver 152 when using the narrow field of view image 260. In the wide field of view image 260', the size of the vehicle 252a and the vehicle 252b may less accurately represent the distance of the vehicle 252a and the vehicle 252b from the vehicle 50 (e.g., not close to the same size as the vehicle 252a and the vehicle 252b in the captured frame 250). For example, the wide angle field of view image 260' may make the vehicles 252a-252b appear farther away than the actual distance from the vehicle 50. In some embodiments, the wide field of view image 260' may be the alternate field of view displayed by the electronic mirror 130.

The driver 152 may select between the narrow field of view image 260 and the wide field of view image 260' (or any other available fields of view) using the interface 104a. Generally, the narrow field of view image 260 may provide better safety (e.g., allow the driver 152 to more accurately judge distance between vehicles on the road). The driver 152 may peek at (e.g., temporarily switch to) the wide field of view image 260' to check for objects in the blind spot. For example, the driver 152 may check the wide field of view image 260' when changing lanes. In some embodiments, the processor 106 may make a decision to select between the narrow field of view image 260 and the wide field of view image 260'. For example, the processor 106 may make the decision based on the status information and/or the detected objects (e.g., if one of the vehicles 252a-252b are determined to be in a blind spot of the driver 152).

Figure 11:
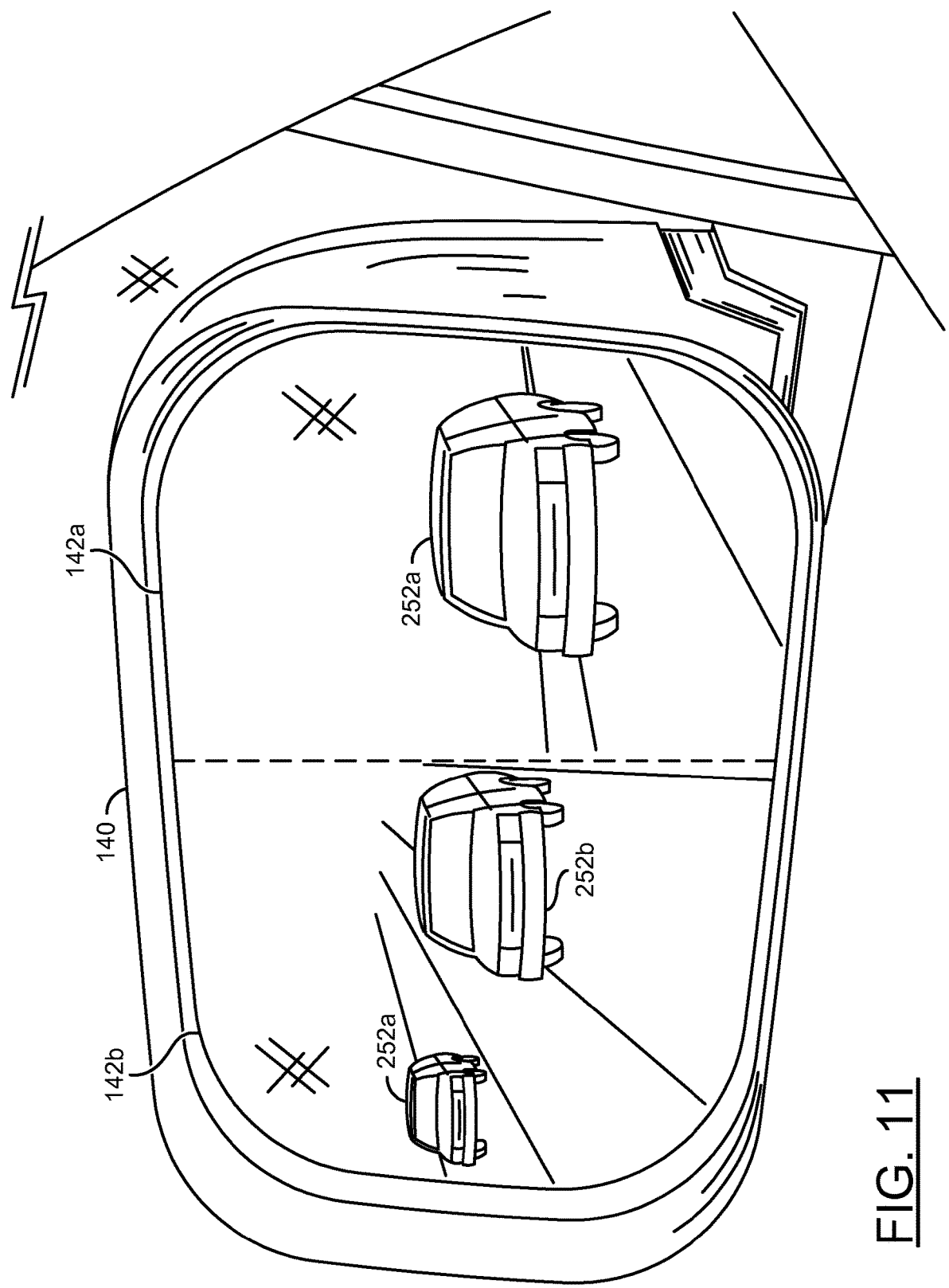
FIG. 11 is a diagram illustrating the electronic mirror displaying multiple fields of view on the same display.

Referring to FIG. 11, the electronic mirror 140 displaying multiple fields of view in an adjacent picture arrangement on the same display is shown. Both the narrow field of view FOVA_N (or FOVB_N) and the wide field of view FOVA_W (or FOVA_W) are shown. The electronic mirror 140 may have multiple outputs 142a-142b. The outputs 142a-142b may be portions of the electronic mirror display 140. For example, the output 142a may be a right half of the electronic mirror display 140 and the output 142b may be a left half of the electronic mirror display 140. In another example, the output 142a may be a top half of the electronic mirror display 140 and the output 142b may be a bottom half of the electronic mirror display 140. The portions of the electronic mirror 140 may have a size measured as a distance (e.g., inches, centimeters, etc.) and/or a number of pixels (e.g., a display resolution). While only two outputs are shown, the number of outputs may be varied according to the design criteria of a particular implementation.

The right output 142a (e.g., the output closest to the driver 152) may display the narrow field of view image 260 (e.g., FOVA_N). The left output 142b (e.g., the output farther away from the driver 152) may display the wide field of view image 260' (e.g., FOVA_W). The electronic mirror 140 may allow both the narrow field of view image 260 and the wide field of view image 260' to be displayed simultaneously (or nearly simultaneously). Displaying both the fields of view FOVA_N and FOVA_W may improve driver safety. For example, displaying both fields of view may provide the driver 152 with an accurate representation of the distance of other vehicles and a view of vehicles in the blind spot (e.g., the advantages of both fields of view).

The images 260 and/or 260' may be cropped by the processor 106 to fit the outputs 142a-142b. In some embodiments, the images 260 and/or 260' may be distorted (e.g., the aspect ratio may be adjusted) to accommodate the outputs 142a-142b. Various arrangements of the outputs 142a-142b may be implemented to reduce and/or minimize distortion.

Figure 12:
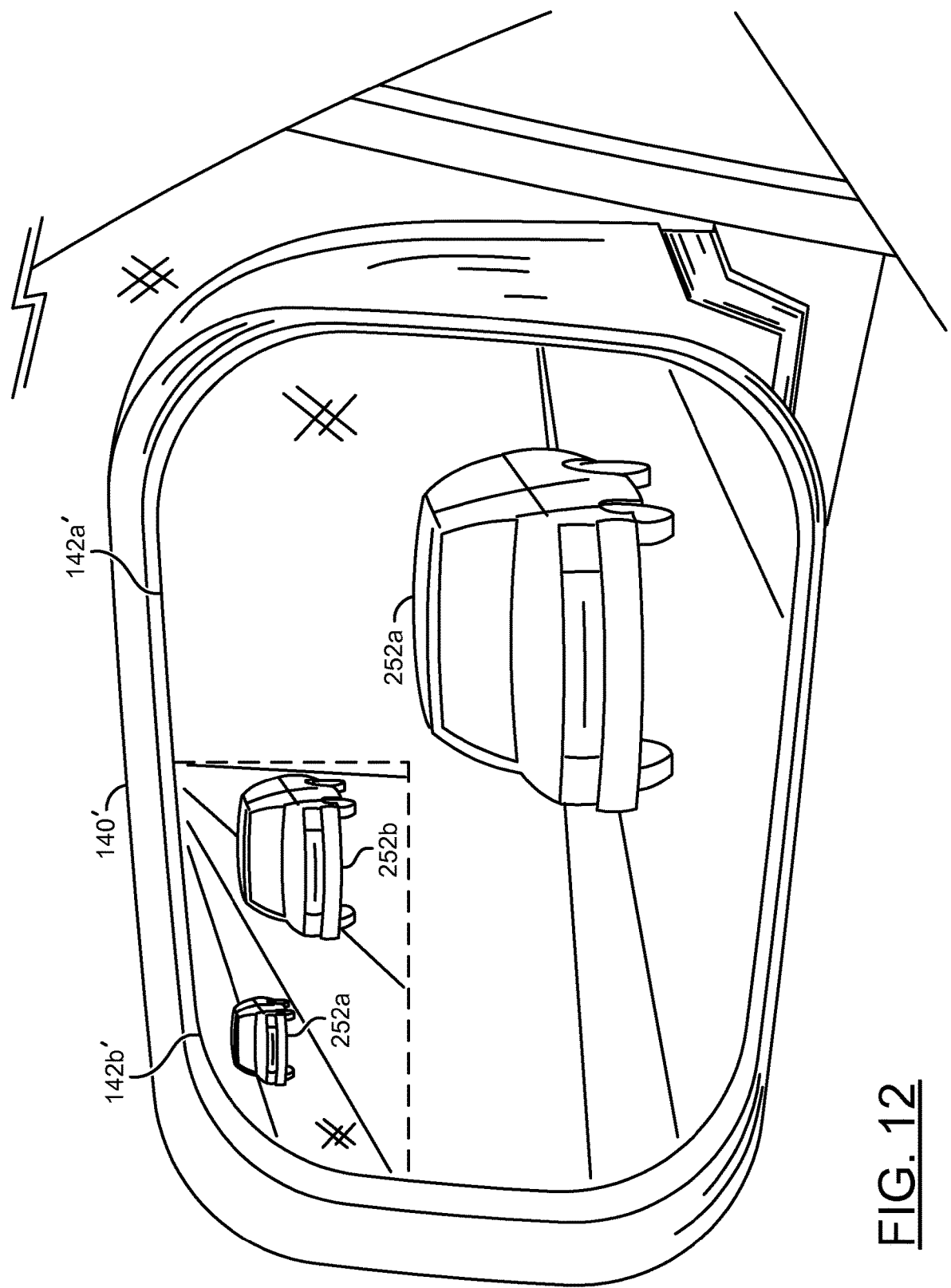
FIG. 12 is a diagram illustrating the electronic mirror displaying multiple fields of view in a picture-in-picture arrangement.

Referring to FIG. 12, the electronic mirror 140' displaying multiple fields of view on the same display in a picture-in-picture arrangement is shown. Both the narrow field of view FOVA_N (or FOVB_N) and the wide field of view FOVA_W (or FOVB_W) are shown. The electronic mirror 140' may have multiple outputs 142a'-142b'. The outputs 142a'-142b' may be portions of the electronic mirror display 140'. The outputs 142a'-142b' are arranged such that the output 142a' covers a larger portion of the electronic mirror 140' and the output 142b' covers a smaller portion of the electronic mirror 140'. The output 142b' is shown in a top left corner of the electronic mirror 140'. While only two outputs are shown, the number, size and/or arrangement of the outputs may be varied according to the design criteria of a particular implementation.

The narrow field of view image 260 is shown as the larger output 142a'. The wide field of view image 260' is shown as the smaller output 142b'. The wide field of view image 260' is displayed in the narrow field of view image 260 (e.g., a picture-in-picture arrangement). The picture-in-picture arrangement may allow the driver 152 to see an accurate representation of the distance of the vehicle 252a while still providing a view of the blind spot. The picture-in-picture arrangement may allow the images 260 and/or 260' to be displayed at the same time without distorting the images and/or adjusting the aspect ratio.

Figure 13:
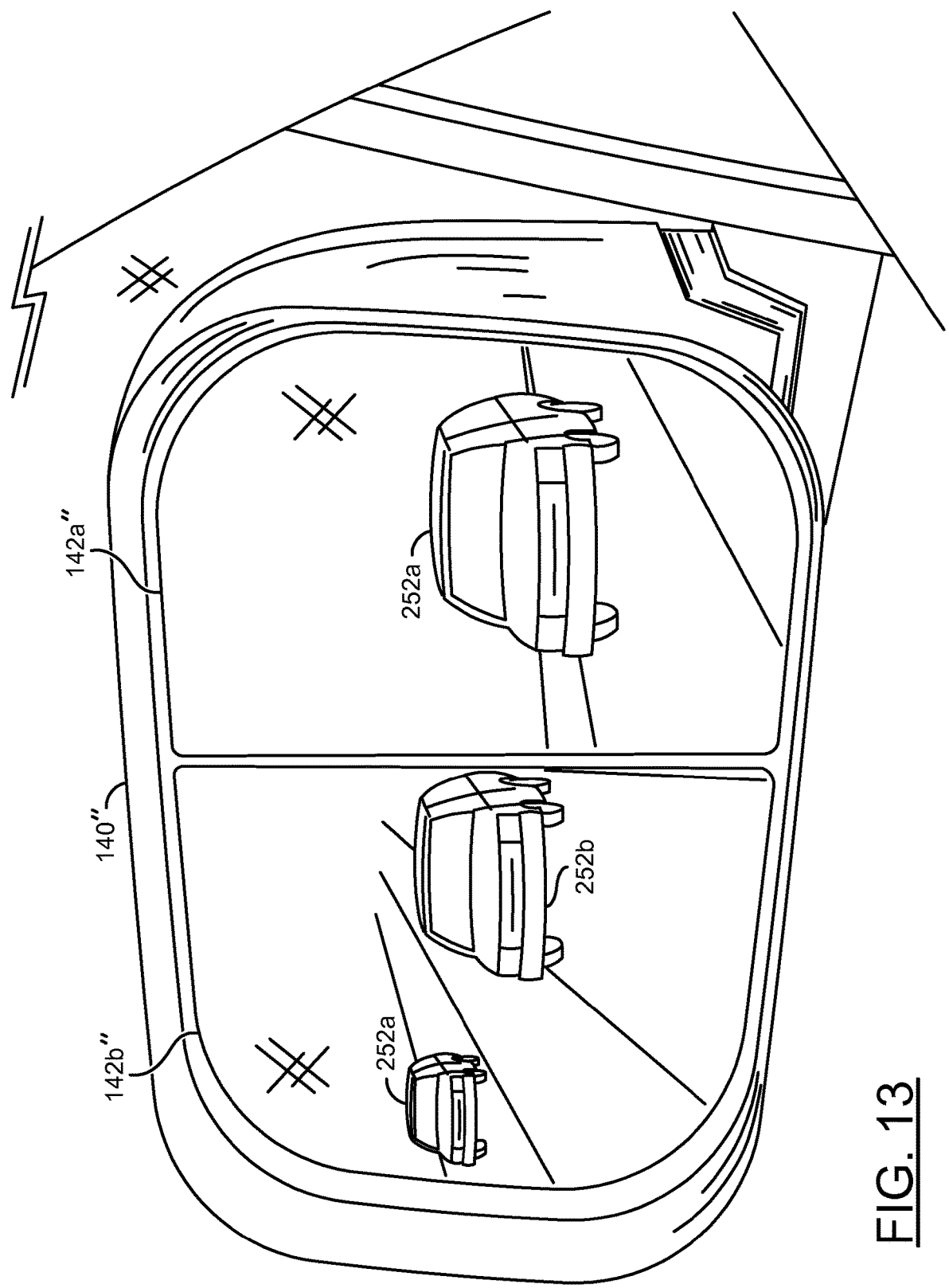
FIG. 13 is a diagram illustrating the multiple fields of view being displayed on multiple adjacent display devices.

Referring to FIG. 13, the electronic mirror 140" with multiple fields of view being displayed on multiple adjacent display devices is shown. Both the narrow field of view FOVA_N (or FOVB_N) and the wide field of view FOVA_W (or FOVB_W) are shown. The electronic mirror 140" may have multiple outputs 142a"-142b". The outputs 142a"-142b" may be adjacent display devices (e.g., separate LCD screens) on the electronic mirror display 140". For example, the output 142a" may be a display device on a right half of the electronic mirror display 140" and the output 142b" may be a display device on a left half of the electronic mirror display 140". In another example, the output 142a" may be a display device on a top half of the electronic mirror display 140" and the output 142b" may be a display device on a bottom half of the electronic mirror display 140". While only two display devices are shown, the number of outputs may be varied according to the design criteria of a particular implementation.

The right display device 142a" (e.g., the output closest to the driver 152) may display the narrow field of view image 260 (e.g., FOVA_N). The left display device 142b" (e.g., the output farther away from the driver 152) may display the wide field of view image 260' (e.g., FOVA_W). The electronic mirror 140" may allow both the narrow field of view image 260 and the wide field of view image 260' to be displayed simultaneously (or nearly simultaneously). Displaying both the fields of view FOVA_N and FOVA_W may improve driver safety. For example, displaying both fields of view may provide the driver 152 with an accurate representation of the distance of other vehicles and a view of vehicles in the blind spot.

The images 260 and/or 260' may be versions of the captured frame 250 cropped (e.g., by the processor 106) to fit the display devices 142a"-142b". In some embodiments, the images 260 and/or 260' may be distorted (e.g., the aspect ratio may be adjusted) to accommodate the shape of the display devices 142a"-142b". Various arrangements of the outputs 142a"-142b" may be implemented to reduce and/or minimize distortion.

Figure 14:
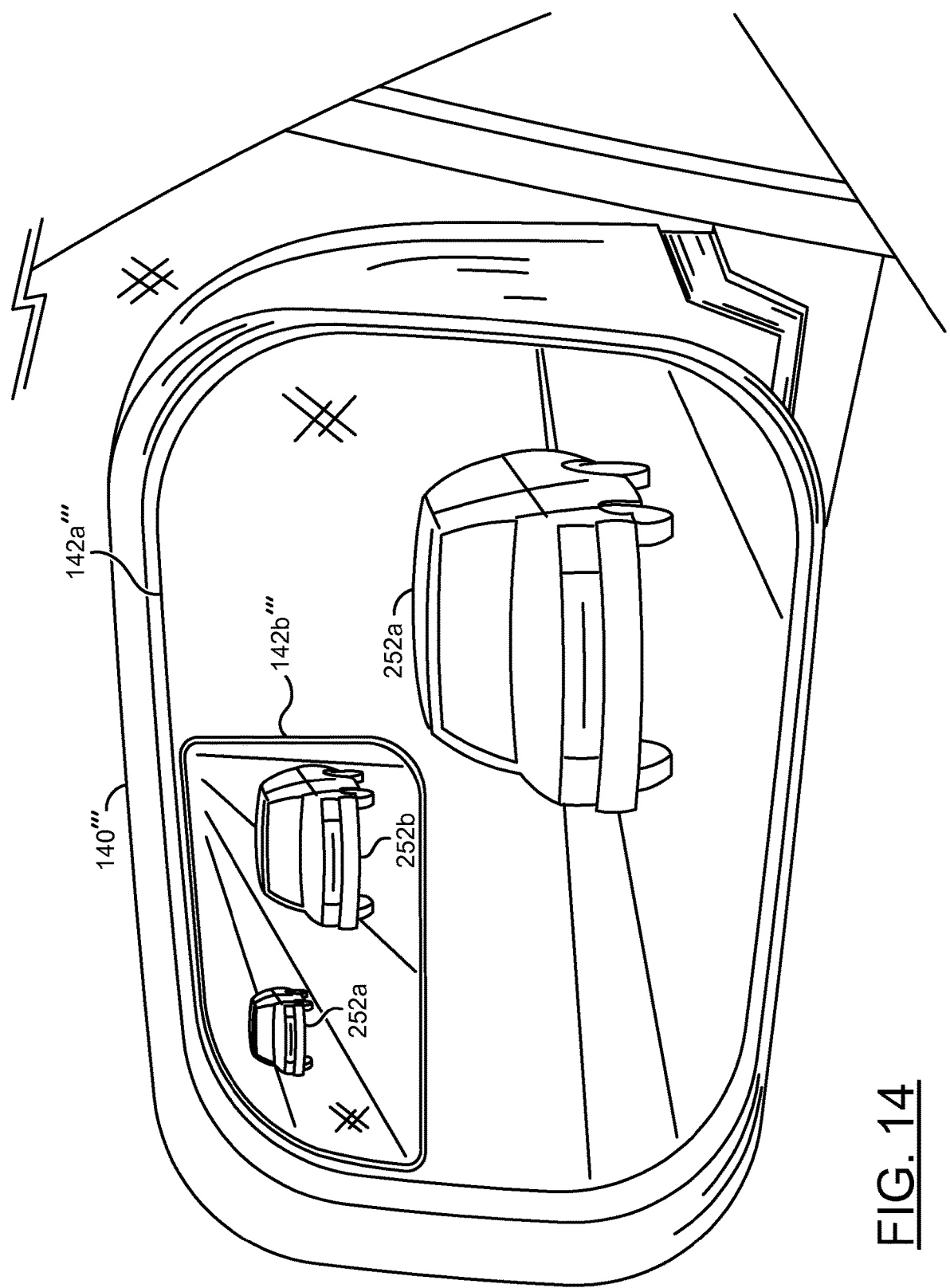
FIG. 14 is a diagram illustrating the multiple fields of view being displayed on multiple overlaid display devices.

Referring to FIG. 14, the electronic mirror 140''' with multiple fields of view being displayed on multiple overlaid display device is shown. Both the narrow field of view FOVA_N (or FOVB_N) and the wide field of view FOVA_W (or FOVB_W) are shown. The electronic mirror 140''' may have multiple outputs 142a'''-142b'''. The outputs 142a'''-142b''' may be display devices of the electronic mirror display 140''' overlaid on top of each other. The display devices 142a'''-142b''' are arranged such that the display device 142a''' fits the shape of the electronic mirror 140''' and the display device 142b''' covers (e.g., is on top of) a portion of the electronic mirror 140''' and the display device 142a'''. The display device 142b''' is shown covering a top left corner of the display device 142a'''. While only two display devices are shown, the number, size and/or arrangement of the outputs may be varied according to the design criteria of a particular implementation.

The narrow field of view image 260 is shown as the larger, bottom display device 142a'''. The wide field of view image 260' is shown as the smaller, top display device 142b'''. The wide field of view image 260' is displayed on top of the narrow field of view image 260 (e.g., one display device covers the other display device). The overlaid arrangement of the display devices 142a'''-142b''' may allow the driver 152 to see an accurate representation of the distance of the vehicle 252a while still providing a view of the blind spot. The overlaid arrangement may allow the images 260 and/or 260' to be displayed at the same time without distorting the images and/or adjusting the aspect ratio.

Figure 15:
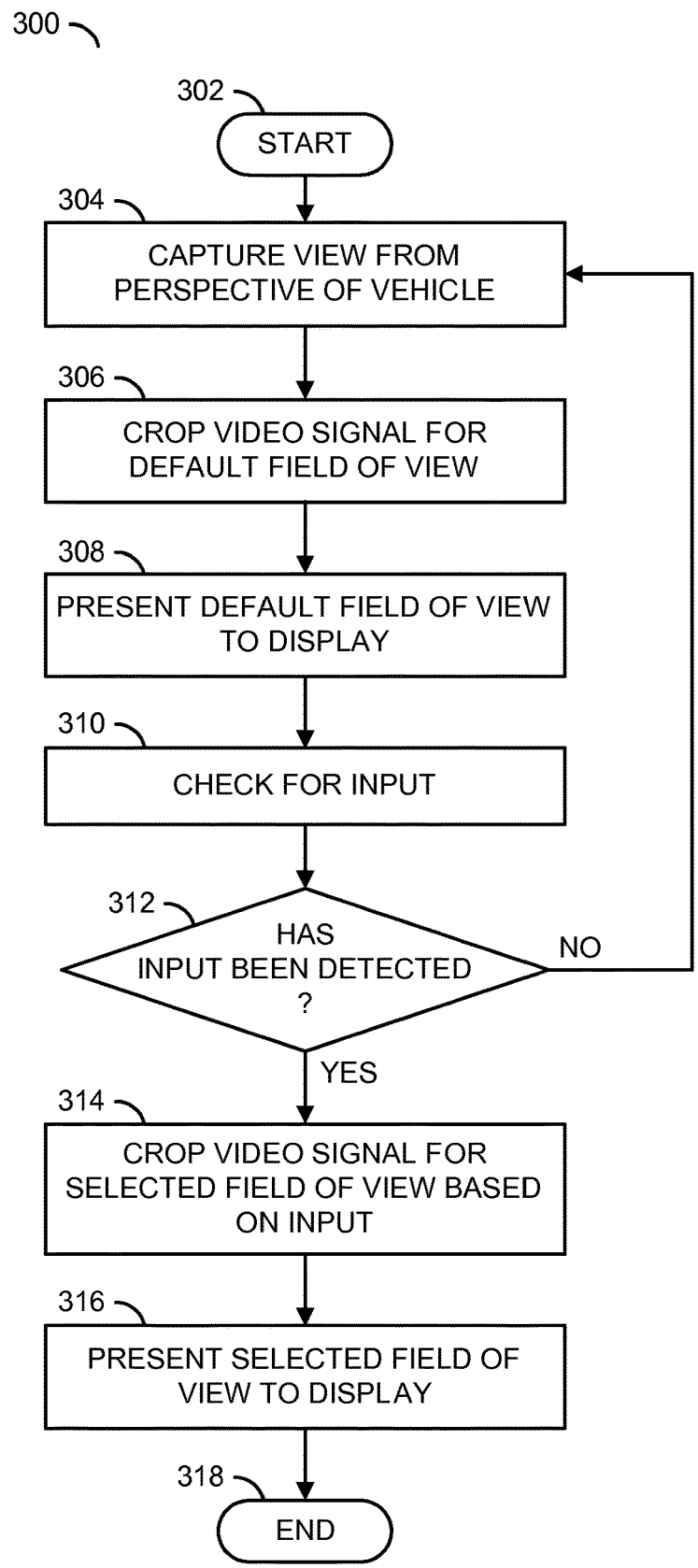
FIG. 15 is a flow diagram illustrating a method for selecting a field of view to display on an electronic mirror based on an input.

Referring to FIG. 15, a method (or process) 300 is shown. The method 300 may select a field of view to display on the electronic mirror 130 based on an input. The method 300 generally comprises a step (or state) 302, a step (or state) 304, a step (or state) 306, a step (or state) 308, a step (or state) 310, a decision step (or state) 312, a step (or state) 314, a step (or state) 316, and a step (or state) 318. The steps 302-318 may be performed by the processor 106 in response to computer executable instructions stored in the memory 108.

The state 302 may start the method 300. The state 304 may capture a targeted view from the perspective of the vehicle 50 (e.g., using the lens 112 and/or the capture device 102). Next, in the state 306 the processor 106 may crop the video signal (e.g., the signal VIDEO) for the default field of view. In the state 308, the processor 106 may present the default field of view (e.g., the signal VIDEO_OUT) to the display device (e.g., the electronic mirror) 130. The state 310 may check for an input (e.g., the signal INPUT, the signal STATUS, a signal generated by the processor 106 in response to detected objects, a signal generated by the processor 106 in response to a decision made by the processor 106, etc.). Next, the method 300 may move to the decision state 312.

If the decision state 312 determines the input has not been detected, the method 300 may return to the state 304. If the decision state 312 determines the input has been detected, the method 300 may move to the state 314. In the state 314, the processor 106 may crop the video signal (e.g., the signal VIDEO) for the selected field of view based on the received input. In the state 316, the processor 106 may present the selected field of view (e.g., the signal VIDEO_OUT) to the display device (e.g., the electronic mirror) 130. Next the method 300 may move to the state 318. The state 318 may end the method 300.

Figure 16:
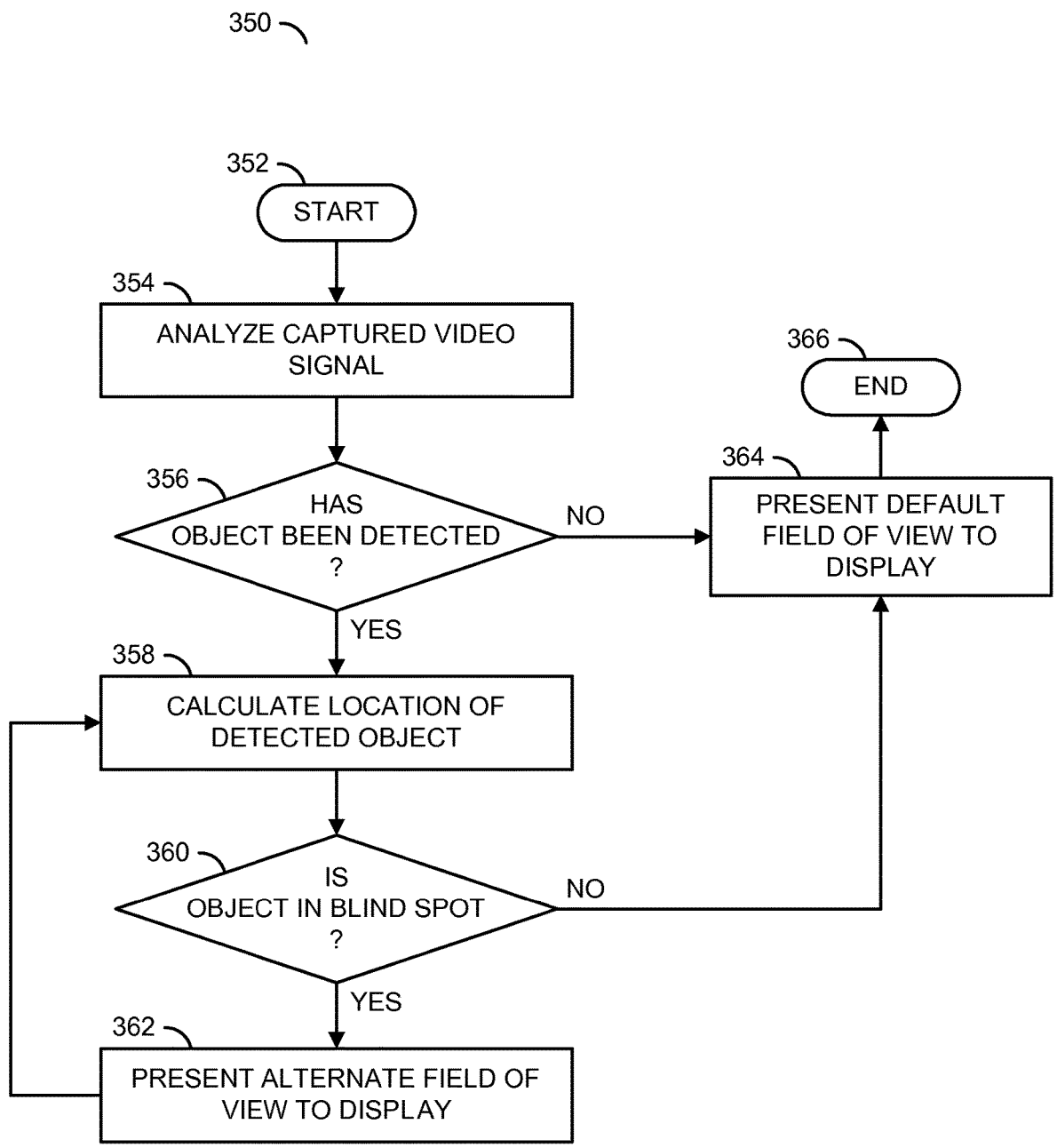
FIG. 16 is a flow diagram illustrating a method for switching fields of view displayed based on objects detected in a video signal.

Referring to FIG. 16, a method (or process) 350 is shown. The method 350 may switch between fields of view displayed based on objects detected in the video signal. The method 350 generally comprises a step (or state) 352, a step (or state) 354, a decision step (or state) 356, a step (or state) 358, a decision step (or state) 360, a step (or state) 362, a step (or state) 364, and a step (or state) 366. The steps 352-366 may be performed by the processor 106 in response to computer executable instructions stored in the memory 108.

The state 352 may start the method 350. In the state 354, the processor 106 may analyze the captured video signal (e.g., the signal VIDEO). Next, the method 350 may move to the decision state 356.

If the decision state 356 determines an object has not been detected, the method 350 may move to the state 364. If the decision state 356 determines an object has been detected (e.g., the vehicles 252a-252b), the method 350 may move to the state 358. In the state 358, the processor 106 may calculate the location of the detected object(s). Next, the method 350 may move to the decision state 360.

If the decision state 360 determines the object is in the blind spot of the driver 152 (e.g., the vehicle 252b), the method 350 may move to the state 362. In the state 362, the processor 106 may present the alternate field of view to the display (e.g., the electronic mirror) 130. Next, the method 350 may return to the state 358. If the decision state 360 determines the object is not in the blind spot of the driver 152 (e.g., the vehicle 252a), the method 350 may move to the state 364. In the state 364, the processor 106 may present the default field of view to the display (e.g., the electronic mirror) 130. Next, the method 350 may move to the state 366. The state 366 may end the method 350.

Figure 17:
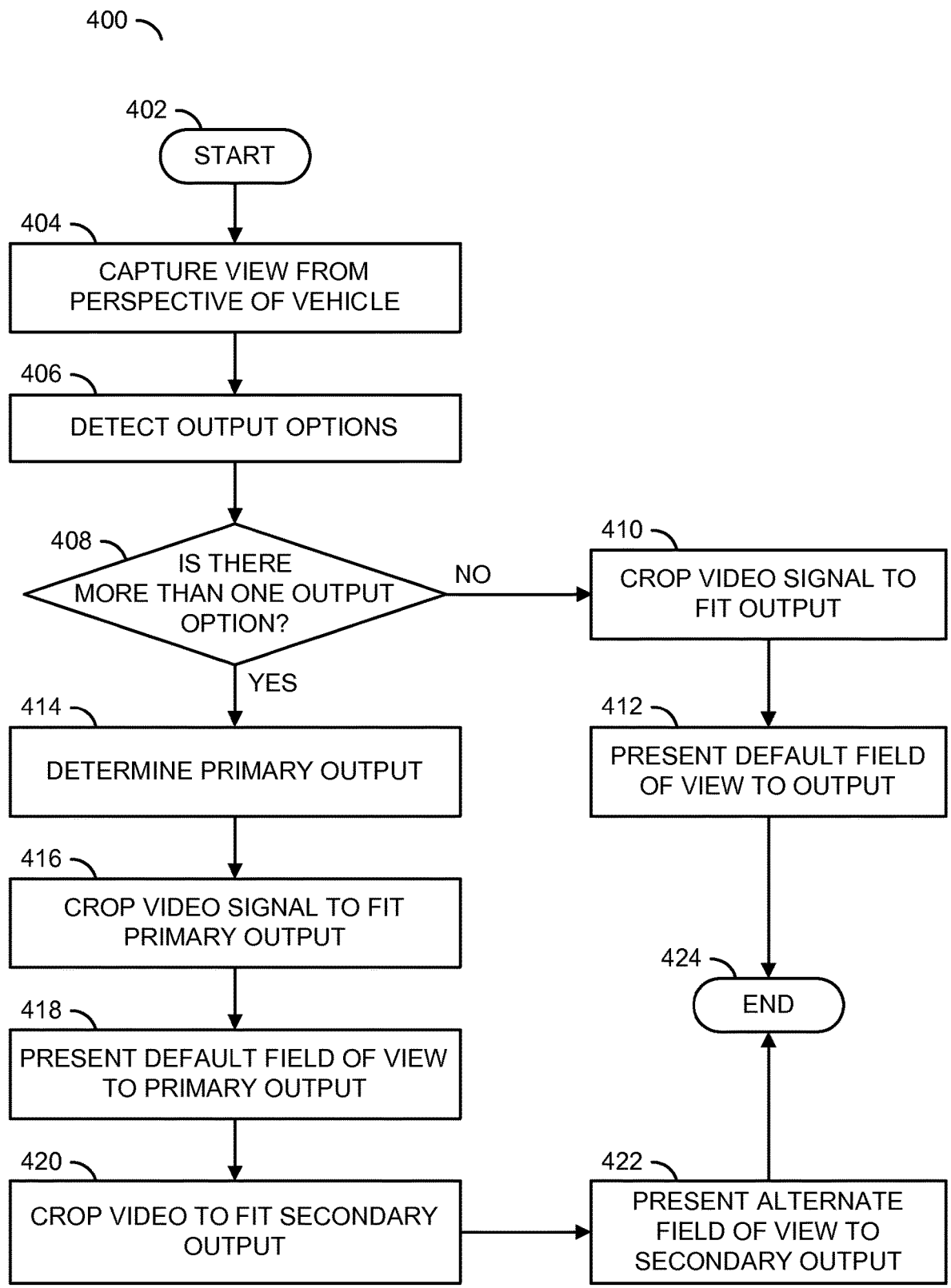
FIG. 17 is a flow diagram illustrating a method for presenting multiple fields of view to multiple output options.

Referring to FIG. 17, a method (or process) 400 is shown. The method 400 may present multiple fields of view to multiple output options. The method 400 generally comprises a step (or state) 402, a step (or state) 404, a step (or state) 406, a decision step (or state) 408, a step (or state) 410, a step (or state) 412, a step (or state) 414, a step (or state) 416, a step (or state) 418, a step (or state) 420, a step (or state) 422, and a step (or state) 424. The steps 402-424 may be performed by the processor 106 in response to computer executable instructions stored in the memory 108.

The state 402 may start the method 400. In the state 404, the capture device 102 may capture the targeted view from the perspective of the vehicle 50. Next, in the state 406, the processor 106 may detect the output options (e.g., the display device 130, the display device 140, the processor 140', the portions 142a-142b of the display device 140, the display devices 142a"-142b" of the display device 140", the pins 142a'-142n' of the processor 140', etc.). Next, the method 400 may move to the decision state 408.

If the decision state 408 determines there is not more than one output option, the method 400 may move to the state 410. In the state 410, the processor 106 may crop the video signal (e.g., the signal VIDEO) to fit the output. In the state 412, the processor 106 may present the default field of view to the output (e.g., the electronic mirror 130). Next, the method 400 may move to the state 424.

If the decision state 408 determines there is more than one output option, the method 400 may move to the state 414. The state 414 may determine the primary output (e.g., the output 142a' in the picture-in-picture arrangement, the display device 142a" in the adjacent display device arrangement, etc.). In the state 416, the processor 106 may crop the video signal (e.g., the signal VIDEO) to fit the primary output. Next, in the state 418, the processor 106 may present the default field of view to the primary output (e.g., VIDEO_OUTA).

In the state 420, the processor 106 may crop the video signal to fit the secondary output (e.g., the output 142b' in the picture-in-picture arrangement, the display device 142b" in the adjacent display arrangement, etc.). In the state 422, the processor 106 may present the alternate field of view to the secondary output (e.g., VIDEO_OUTB). Similar states for cropping and presenting may be performed for any other output devices. Next, the method 400 may move to the state 424. The state 424 may end the method 400.

The method 400 may be applied to any type of output device. For example, if the output devices are multiple display devices (e.g., LCD screens), the method 400 may determine a primary display device and any secondary display devices. In another example, if the output devices are multiple portions of a single display device (e.g., a picture-in-picture arrangement and/or adjacent picture arrangements), the method 400 may determine a primary portion and any secondary portions for the display device. The number and/or types of outputs may be varied according to the design criteria of a particular implementation.

The use of eMirrors such as the electronic mirror 130 may allow flexibility and/or adaptability that is difficult to attain with conventional reflective mirrors. The electronic mirror 130 may emulate and improve on solutions used to provide multiple fields of view for conventional reflective mirrors. The camera system 100 may automate some of the switching between the various fields of view instead of having the driver 152 do so manually (e.g., to prevent the driver 152 from having to manually aim the mirror to provide a suitable view). The camera system 100 may be configured to install and/or interface with existing displays 130 (e.g., a retrofit with no additional cost).

The camera system 100 may implement a wider FOV camera configured to stream video to an LCD screen (e.g., the electronic mirror 130). The captured video stream may be processed by the processor 106. The processor 106 may be configured to change the FOV (e.g., using video cropping techniques) of the camera system 100 to a narrower or wider view.

In some embodiments, the processor 106 may change the FOV based on an input signal (e.g., INPUT) received from a user (e.g., the driver 152). For example, the driver 152 may press a button or select from a menu (e.g., the interface 104a). The driver 152 may select a preferred view and/or switch between several pre-defined settings (e.g., views). For example, if the driver 152 defines two views the driver 152 may press and hold a button (e.g., on the steering wheel) to allow the driver 152 to "peek" at an alternate (e.g., wider) view, but use the default (e.g., narrower) view most of the time.

In some embodiments, the processor 106 may change the FOV based on the status information (e.g., STATUS) from the vehicle 50. For example, the status information may be the use of a turn signal in the direction of the electronic mirror 130. In another example, the status information may be a turn of the steering wheel in the direction of the mirror electronic mirror 130. Any type of information that may indicate the vehicle 50 is moving, or about to move, may be used as the status information to allow the processor 106 to change FOVs. For example, when the turn signals are off the FOV may be narrow (e.g., FOVAN), but when the left turn signal is turned on the FOV on the left eMirror 130a may widen automatically (e.g., FOVA_W).

In some embodiments, the processor 106 may change the FOV based on the detected objects (e.g., 252a-252b). The processor 106 may be configured to analyze the video signal (e.g., VIDEO) using machine vision techniques to detect that an object is about to move into a blind zone of the driver 152. For example, if a car (e.g., the vehicle 252b) is determined to be overtaking the ego vehicle 50 on the right side (e.g., as shown in the video frame 250), the FOV on the right eMirror 130b may widen (e.g., FOVB_W) for a few seconds (or for as long as the vehicle 252b is determined by the processor 106 to be in the blind spot). Monitoring the blind spots of the driver may be performed by the camera system 100 and/or another device. Blind-spot monitoring may be performed as described in U.S. application Ser. No. 14/706,222, filed May 7, 2015, which is hereby incorporated by reference in its entirety.

The wide FOV camera 102 may be used by the camera system 100 to stream videos to two adjacent display devices (e.g., the outputs 142a"-142b" as shown in FIG. 13). For example, the display device located closer to the driver 152 (e.g., the display device 142a") may show one FOV (e.g., the narrow FOVA_N and/or another FOV based on the preferences of the driver 152) and the display device located farthest from the driver 152 (e.g., the display device 142b") may show another FOV (e.g., the wide FOVA_W and/or another FOV based on the preferences of the driver 152). Both the FOVs FOVA_N and FOVA_W and/or any other selected FOV may be created by the processor 106 cropping various windows from one image sensor signal (e.g., the signal VIDEO from the capture device 102).

The wide FOV camera 102 may be used by the camera system 100 to stream videos to one LCD screen (e.g., the display device 140) in a side-by-side (e.g., adjacent picture arrangement) view. The portions of the display device 140 may be the outputs 142a-142b as shown in FIG. 11. For example, the output portion located closer to the driver 152 (e.g., the output portion 142a) may show one FOV (e.g., the narrow FOVA_N and/or another FOV based on the preferences of the driver 152) and the output portion located farthest from the driver 152 (e.g., the output portion 142b) may show another FOV (e.g., the wide FOVA_W and/or another FOV based on the preferences of the driver 152). Both the FOVs FOVAN and FOVA_W and/or any other selected FOV may be created by the processor 106 cropping various windows from one image sensor signal (e.g., the signal VIDEO from the capture device 102).

The wide FOV camera 102 may be used by the camera system 100 to stream videos to two LCD screens overlaid on top of one another. The two LCD screens may be outputs 142a'''-142b''' as shown in FIG. 14. A larger LCD screen underneath (e.g., the display device 142a''') may display one FOV (e.g., the narrow FOVA_N and/or another FOV based on the preferences of the driver 152) and the smaller LCD on top (e.g., the display device 142b''') may display another FOV (e.g., the wide FOVA_W and/or another FOV based on the preferences of the driver 152). Both the FOVs FOVA_N and FOVA_W and/or any other selected FOV may be created by the processor 106 cropping various windows from one image sensor signal (e.g., the signal VIDEO from the capture device 102).

The wide FOV camera 102 may be used by the camera system 100 to stream videos to one LCD display (e.g., the display device 140') with a picture-in-picture view. The portions of the display device 140' may be the outputs 142a'-142b' as shown in FIG. 12. For example, the larger portion of the LCD underneath (e.g., the output portion 142a') shows one FOV (e.g., the narrow FOVA_N and/or another FOV based on the preferences of the driver 152) and the smaller part of the LCD on top (e.g., the output portion 142b') shows another FOV (e.g., the wide FOVA_W and/or another FOV based on the preferences of the driver 152). The output portion 142b' may cover the output portion 142a' and/or be rendered instead of the portion of the output portion 142a' corresponding to the location and size of the output portion 142b'. Both the FOVs FOVA_N and FOVA_W and/or any other selected FOV may be created by the processor 106 cropping various windows from one image sensor signal (e.g., the signal VIDEO from the capture device 102).

In some embodiments, each of the arrangements described in FIGS. 9-14 may be implemented using the camera system 100". For example, the processor 106' may receive signals (e.g., VIDEO_A-VIDEO_B) from two separate image sensors 102a'-102b' to create the two views (e.g., VIDEO_OUTA-VIDEO_OUTB).

In some embodiments, each of the arrangements described in FIGS. 9-14 may be implemented using the camera system 100"". For example two (or more) processors (e.g., 106a-106b) may each be connected to a corresponding image sensor (e.g., 102a'-102b') and a corresponding LCD display (e.g., 142a'-142b'). Each processor (e.g., 106a-106b) may present a single cropped video output (e.g., VIDEO_OUTA-VIDEO_OUTB) to a corresponding one of the connected LCDs (e.g., 142a'-142b').

In some embodiments, each of the arrangements described in FIGS. 9-14 may be implemented using the camera system 100"" where the output device 140' is a third processor. For example, the two processors 106a-106b may present the output signals VIDEO_OUTA-VIDEO_OUTB to pins 142a'-142b' of the third processor (or microprocessor) 140'. The processor 140' may be configured to merge the video signals VIDEO_OUTA-VIDEO_OUTB. The merged video signal OUT may be a dual-view presented as an input to one LCD.

The FOVs shown in the multiple LCDs may or may not overlap. For example, the wide FOVA_W may show some portions of the targeted view that are also shown in the narrow FOVA_N (e.g., the vehicle 252a is shown in both views). The processor 106 may also select the FOV based on a detected lane change. For example, if the vehicle 50 is changing from the lane 254b to the lane 254a the processor 106 may select the wide FOVA_W. In another example, the processor 106 may select the FOV based on a detected merge attempt (e.g., show the driver 152 that there is something on the left when the vehicle 50 is about to merge into traffic).

The camera system 100 may be used to improve display resolutions and/or contrast ratios for the electronic mirror 130. A high quality capture device 102 may be implemented to improve display quality. Generally, current small LCDs (e.g., a phone screen) may be capable of displaying a 2560*1440 resolution with a 2000:1 contrast ratio. The camera system 100 may be implemented to provide an output video signal that may be clear and provide smooth playback.

The processor 106 may generate the various fields of view to fit the output display devices. The processor 106 may crop the signal VIDEO to provide outputs (e.g., VIDEO_OUT) that fit the output display devices (or portions of the display device). For example, if the sensors 120a-120n are all configured to provide a 4:3 aspect ratio and the displays 140 is split between a 16:9 aspect ratio for the narrow (e.g., default or primary) view and a smaller 16:9 aspect ratio window for the wider (e.g., secondary or alternate or temporary) view, each one of these will involve a different window cropped by the processor 106.

The functions performed by the diagrams of FIGS. 15-17 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories) RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a sensor configured to generate a first video signal based on a targeted view from a vehicle; and
   a processor configured to
   (A) receive said first video signal,
   (B) generate a second video signal by cropping said first video signal and
   (C) present said second video signal to a display, wherein
   (i) said cropping of said first video signal to generate said second video signal creates a series of video frames configured to fit a shape of said display,
   (ii) a plurality of field of view windows are defined within said first video signal prior to said cropping,
   (iii) each of said plurality of field of view windows are cropped from said first video signal, (iv) said processor selects one of said plurality of field of view windows cropped from said first video signal to present as said second video signal based on (a) status information from said vehicle, (b) objects detected in said first video signal and (c) a calculated distance of said detected objects from said vehicle and (v) said calculated distance is determined based on a determining a number of pixels comprising said detected objects in said first video signal.

2. The apparatus according to claim 1, wherein said display (a) is located near a side of said vehicle and (b) emulates a reflective view from a mirror as seen from a point of view of a driver.

3. The apparatus according to claim 1, wherein said selection by said processor is based on an input comprising a selection by a driver.

4. The apparatus according to claim 1, wherein said status information comprises at least one of a turn signal, a direction of a steering wheel and non-speed information from an on-board diagnostics port of the vehicle.

5. The apparatus according to claim 1, wherein (i) said processor is further configured to determine a location of said objects and (ii) said selection by said processor is based on whether one of said objects detected moves into an estimated blind zone of a driver of said vehicle.

6. The apparatus according to claim 1, wherein a first of said plurality of field of view windows provides a default field of view and a second of said plurality of field of view windows provides a temporary field of view.

7. The apparatus according to claim 1, wherein (a) said plurality of field of view windows are provided from said display and as pre-defined settings and (b) said display is positioned near a side of the vehicle towards a driver side seat.

8. The apparatus according to claim 1, wherein (i) a first of said plurality of field of view windows provides a narrow field of view and a second of said plurality of field of view windows provides a wide field of view and (ii) said narrow field of view and said wide field of view represent a same direction for said video frames.

9. The apparatus according to claim 1, wherein each of said plurality of field of view windows has an alternate viewing angle and viewing width.

10. The apparatus according to claim 1, wherein said number of pixels comprising said detected objects is compared to a second number of pixels of a reference object of known size at a known distance to determine said calculated distance.

11. An apparatus comprising:
    a sensor configured to generate a first video signal based on a targeted view from a vehicle; and
    a processor configured to (A) receive said first video signal, (B) generate a second video signal by cropping said first video signal, (C) generate a third video signal by cropping said first video signal, (D) present said second video signal to a first output and (E) present said third video signal to a second output, wherein (i) a plurality of field of view windows are defined within said first video signal generated by said sensor prior to said cropping, (ii) each of said plurality of field of view windows are cropped from said first video signal, (iii) said second video signal presents a first of said plurality of field of view windows.

* * * * *